United States Patent
Fu et al.

(10) Patent No.: US 12,016,325 B2
(45) Date of Patent: Jun. 25, 2024

(54) PLANT IDENTIFICATION IN THE PRESENCE OF AIRBORNE PARTICULATES

(71) Applicant: Blue River Technology Inc., Sunnyvale, CA (US)

(72) Inventors: Chia-Chun Fu, Sunnyvale, CA (US); Christopher Grant Padwick, Menlo Park, CA (US)

(73) Assignee: BLUE RIVER TECHNOLOGY INC., Santa Clara, CA (US)

( * ) Notice: Subject to any disclaimer, the term of this patent is extended or adjusted under 35 U.S.C. 154(b) by 435 days.

(21) Appl. No.: 16/721,140

(22) Filed: Dec. 19, 2019

(65) Prior Publication Data

US 2021/0089771 A1    Mar. 25, 2021

Related U.S. Application Data

(60) Provisional application No. 62/905,543, filed on Sep. 25, 2019.

(51) Int. Cl.
  *G06V 20/56* (2022.01)
  *A01M 7/00* (2006.01)
  (Continued)

(52) U.S. Cl.
  CPC ......... *A01M 7/0089* (2013.01); *G06F 18/214* (2023.01); *G06F 18/2431* (2023.01);
  (Continued)

(58) Field of Classification Search
  CPC ... G06T 7/90; G06T 7/97; G06T 2207/10024; G06T 2207/20081; G06T 2207/20084;
  (Continued)

(56) References Cited

U.S. PATENT DOCUMENTS

| | | |
|---|---|---|
| 2005/0251347 A1 | 11/2005 | Perona et al. |
| 2010/0046827 A1* | 2/2010 | Anderson .......... G06K 9/00127 382/141 |

(Continued)

OTHER PUBLICATIONS

Eddy, P. R. et al. "Hybrid Segmentation—Artificial Neural Network Classification of High Resolution Hyperspectral Imagery for Site-Specific Herbicide Management in Agriculture." Photogrammetric Engineering and Remote Sensing 74 (2008): 1249-1257. ( Year: 2008).*

Mavridou, E. et al., "Machine Vision Systems in Precision Agriculture for Crop Farming," Journal of Imaging, Dec. 7, 2019, pp. 1-32.

(Continued)

*Primary Examiner* — Sean M Conner
(74) *Attorney, Agent, or Firm* — Fenwick & West LLP

(57) ABSTRACT

A farming machine including a number of treatment mechanisms treats plants as the farming machine moves through the field. The control system of the farming machine executes a plant identification model configured to identify plants in the field for treatment. The plant identification model is also configured to identify plants in non-ideal operating conditions. For example, the control system can identify and treat plants in non-ideal operating conditions where airborne particulates are present in an accessed image. The plant identification model is also configured to determine a particulate level in an accessed image and transmit a notification of the particulate level to an operator of the farming system. The control system generates a treatment map identifying which treatment mechanisms to actuate to treat the plants in the field. The farming machine treats the plants in the field according to the treatment map.

20 Claims, 18 Drawing Sheets

(51) Int. Cl.
*G06F 18/214* (2023.01)
*G06F 18/2431* (2023.01)
*G06T 7/90* (2017.01)
*G06V 20/10* (2022.01)

(52) U.S. Cl.
CPC .............. *G06T 7/90* (2017.01); *G06V 20/188* (2022.01); *G06V 20/56* (2022.01); *G06T 2207/10024* (2013.01); *G06T 2207/20081* (2013.01); *G06T 2207/20084* (2013.01); *G06T 2207/30188* (2013.01)

(58) Field of Classification Search
CPC . G06T 2207/20076; G06T 2207/30188; G06T 2207/30181; G06K 9/00657; G06K 9/0063; G06K 9/6256; G06K 9/628; A01M 7/0089; A01M 7/0092; A01M 7/0096
USPC ................................. 382/110, 100, 141, 128
See application file for complete search history.

(56) References Cited

U.S. PATENT DOCUMENTS

| | | |
|---|---|---|
| 2013/0110400 A1 | 5/2013 | Moshe |
| 2015/0245565 A1 | 9/2015 | Pilgrim et al. |
| 2016/0014395 A1* | 1/2016 | Murray ................... G06T 7/251 348/42 |
| 2016/0189007 A1* | 6/2016 | Wellington ............... G06T 7/12 382/110 |
| 2016/0217346 A1* | 7/2016 | Puetter ...................... G06T 7/60 |
| 2016/0260207 A1* | 9/2016 | Fryshman ............ G06K 9/6256 |
| 2017/0206415 A1 | 7/2017 | Redden |
| 2018/0025254 A1 | 1/2018 | Wellington et al. |
| 2019/0066234 A1* | 2/2019 | Bedoya .............. A01D 41/1273 |
| 2019/0362146 A1 | 11/2019 | Polzounov et al. |

OTHER PUBLICATIONS

PCT International Search Report and Written Opinion. PCT Application No. PCT/US2020/052836, dated Dec. 14, 2020, 17 pages.

* cited by examiner

Scaled Array
810

PLANT IDENTIFICATION IN THE PRESENCE OF AIRBORNE PARTICULATES

CROSS REFERENCE TO RELATED APPLICATIONS

This application claims the benefit of U.S. Provisional Application No. 62/905,543 filed Sep. 25, 2019, the contents of which are hereby incorporated in reference in their entirety.

BACKGROUND

Field of Disclosure

This disclosure relates to using a plant identification model to identify and treat plants in a field and, more specifically, using a model that identifies plants in the presence of airborne particulates.

Description of the Related Art

Historically, farming machines that spray crops with treatment fluid have relied on highly non-specific spray techniques such as broadcast spraying. Non-specific spray techniques apply more herbicide than necessary in some cases, a practice which is inefficient and potentially costly for farmers. More recently, non-specific spraying has been supplemented with target-specific spray techniques that utilize detection devices and plant identification models to identify plants in the field. However, even these improved identification techniques can inaccurately identify plants in non-ideal operating conditions (e.g., dusty). Accordingly, a farming machine used for targeted spraying that uses an algorithm to rapidly identify plants in non-ideal operating conditions without sacrificing accuracy, specificity, and resolution would be beneficial.

SUMMARY

A farming machine can include any number of treatment mechanisms to treat plants as the farming machine moves through the field. Each treatment mechanism may be controlled by a control system that actuates the treatment mechanisms at the appropriate time to treat plants as the farming machine travels through the field. The farming machine may also include multiple detection and verification systems to capture images of plants in the field to facilitate treating plants.

The control system employs a plant identification model configured to identify plants in the field. The plant identification model also identifies plants in the field when the farming machine is operating in non-ideal operating conditions (e.g., windy). For example, the plant identification model can identify pixels representing both plant matter and airborne particulates picked up by the wind. Some of the particulate pixels may be identified as obscuring pixels. Obscuring pixels are particulate pixels that obscure a plant in an accessed image. The plant identification model may identify a plant based on both the obscuring pixels and pixels representing the plant in the image.

The plant identification model may also be configured to identify a particulate level based on the image. The particulate level is a quantification of a measure of particulates present in one or more portions of an image. There are several methods to identify a particulate level, some of which are described herein. The control system can generate a notification for the determined particulate level and transmit that notification to an operator of the farming system.

The control system can generate a treatment map using the results of the plant identification model. The treatment map is a data structure that includes information regarding which treatment mechanisms to actuate such that identified plants are treated. To generate a treatment map, the farming machine captures an image of plants in the field. The control system accesses the image and inputs the image to the plant identification model which processes the image to identify plants and/or particulates in the image. After identification, the control system generates a treatment map which maps treatment areas of the treatment mechanisms to areas in the image including identified plants. The control system converts the treatment map into control signals for treatment mechanisms and actuates treatment mechanisms at the appropriate time to treat identified plants. Farming systems that employ plant identification models configured for non-ideal operating conditions identify and treat plants with higher accuracy and specificity than models configured for ideal operating conditions.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

Farming machines that treat plants in a field have continued to improve over time. For example, a crop sprayer can include many independently actuated spray nozzles to spray treatment fluid on specific plants in a field. The farming machine can further include detection mechanisms that can detect both plants in the field and treatments made to plants in the field. Recently, farming machines have included control systems executing algorithms to automatically detect and treat plants using the detection mechanisms. Traditionally, the algorithms are wasteful because they treat areas in the field that do not include identified plants, as, often, the algorithms sacrifice accuracy for processing speed.

Described herein is a farming machine that employs a machine learning model that automatically determines, in real-time, plants in a field and treats the identified plants using a treatment mechanism. In an example, the machine learning model is a semantic segmentation model, but could be other machine learning models. The model is trained to function in non-ideal operating conditions. In example, a semantic segmentation model encodes an image of the field (e.g., an image crops including airborne particulates) using a convolutional neural network. The network is configured to reduce the encoded image to a latent representation space and trained to identify plants in that representation space. Rather than decoding the identified plants back to an image, the model decodes the identified plants to a treatment map. The farming machine uses the treatment map to generate machine instructions for treating identified plants in the field. The dimensionality of the treatment map is, generally, much less than the dimensionality of the image and, therefore, the processing time is reduced. The semantic segmentation model has higher accuracy, specificity, and provides better resolution for the treatment mechanisms than other traditional plant identification models.

II. Plant Treatment System

Figure 1A:
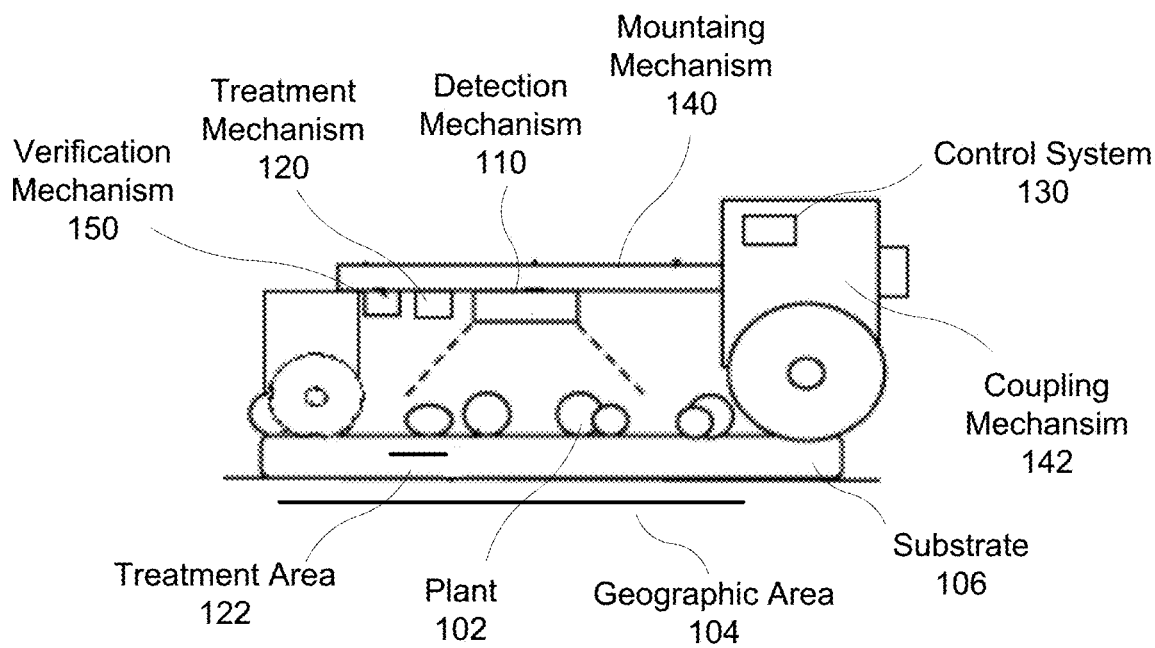
FIGS. 1A and 1B are side and front views of a system for applying a treatment fluid to plants in a field, according to one example embodiment.
Figure 1B:
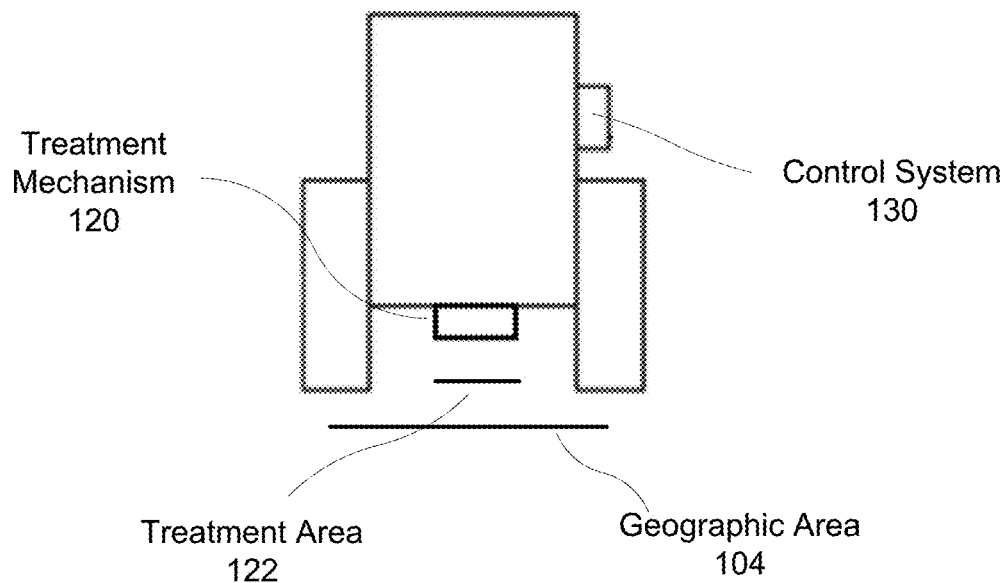

FIG. 1A is a side view illustration of a system for applying a treatment fluid to plants in a field and FIG. 1B is a front view illustration of the same system, according to one example embodiment. The farming machine 100 for plant treatment includes a detection mechanism 110, a treatment mechanism 120, and a control system 130. The farming machine 100 can additionally include a mounting mechanism 140, a verification mechanism 150, a power source, digital memory, communication apparatus, or any other suitable component.

The farming machine 100 functions to apply a treatment to one or multiple plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necroing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, insecticide, fungicide, etc.) to the plant, or treating the plant in any other suitable manner. Regulating plant 102 growth can include promoting plant growth, promoting growth of a plant portion, hindering (e.g., retarding) plant or plant portion growth, or otherwise controlling plant growth. Examples of regulating plant 102 growth includes applying growth hormone to the plant, applying fertilizer to the plant or substrate 106, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent the plant.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g. same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate.

The treatment mechanism 120 of the farming machine 100 functions to apply a treatment to the identified plant 102. The treatment mechanism 120 includes a treatment area 122 to which the treatment mechanism 120 applies the treatment. The effect of the treatment can include plant necrosis, plant growth stimulation, plant portion necrosis or removal, plant portion growth stimulation, or any other suitable treatment effect. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 can include a single treatment mechanism 120, or can include multiple treatment mechanisms. The multiple treatment mechanisms can be the same type of treatment mechanism, or be different types of treatment mechanisms. The treatment mechanism 120 can be fixed (e.g., statically coupled) to the mounting mechanism 140 or relative to the detection mechanism 110, or actuate relative to the mounting mechanism 140 or detection mechanism 110. For example, the treatment mechanism 120 can rotate or translate relative to the detection mechanism 110 and/or mounting mechanism 140. In one variation, the farming machine 100 includes an assembly of treatment mechanisms, wherein a treatment mechanism 120 (or subcomponent of the treatment mechanism 120) of the assembly is selected to apply the treatment to the identified plant 102 or portion of a plant in response to identification of the plant and the plant position relative to the assembly. In a second variation, the farming machine 100 includes a single treatment mechanism, wherein the treatment mechanism is actuated or the farming machine 100 moved to align the treatment mechanism 120 active area 122 with the targeted plant 102. In a third variation, the farming machine 100 includes an array of treatment mechanisms 120, wherein the treatment mechanisms 120 are actuated or the farming machine 100 is moved to align the treatment mechanism 120 active areas 122 with the targeted plant 102 or plant segment.

In one example configuration, the farming machine 100 can additionally include a mounting mechanism 140 that functions to provide a mounting point for the system components. In one example, as shown in FIG. 1A, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame, but can alternatively be any other suitable mounting mechanism. In some configurations, there may be no mounting mechanism 140, or the mounting mechanism can be incorporated into any other component of the farming machine 100.

In one example farming machine 100, the system may also include a first set of coaxial wheels, each wheel of the set arranged along an opposing side of the mounting mechanism 140, and can additionally include a second set of coaxial wheels, wherein the rotational axis of the second set of wheels is parallel the rotational axis of the first set of wheels. However, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but alternatively the front of the drive mechanism or to the side of the drive mechanism. Alternatively, the farming machine 100 can include the drive mechanism (e.g., a motor and drive train coupled to the first and/or second set of wheels). In other example systems, the system may have any other means of traversing through the field.

In some example systems, the detection mechanism 110 can be mounted to the mounting mechanism 140, such that the detection mechanism 110 traverses over a geographic location before the treatment mechanism 120 traverses over the geographic location. In one variation of the farming machine 100, the detection mechanism 110 is statically mounted to the mounting mechanism 140 proximal the treatment mechanism 120. In variants including a verification mechanism 150, the verification mechanism 150 is arranged distal the detection mechanism 110, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other systems, the detection mechanism 110 can be incorporated into any other component of the farming machine 100.

In some configurations, the farming machine 100 can additionally include a verification mechanism 150 that functions to record a measurement of the ambient environment of the farming machine 100, which is used to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110, or be different from the detection mechanism 110. The verification mechanism 150 can be a multispectral camera, a stereo camera, a CCD camera, a single lens camera, a CMOS sensor, a hyperspectral imaging system, LIDAR system (light detection and ranging system), dynamometer, IR camera, thermal camera, humidity sensor, light sensor, temperature sensor, or any other suitable sensor. In other configurations of the farming machine 100, the verification mechanism 150 can be included in other components of the system.

In some configurations, the farming machine 100 can additionally include a power source, which functions to power the system components, including the detection mechanism 120, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 can additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

III. Plant Identification

A farming machine 100 obtains images of a field using a detection mechanism 110 as the farming machine 100 travels through the field. Each obtained image includes information that represents various features and objects in the field. For example, an image can include information representing a plant, a plant treatment, soil, field conditions, dust, particulates, etc. The information can include color, shapes, sizes, metadata of the image, detection mechanism characteristics, pixel information, etc. The control system 130 can access and process the image to determine the features and objects in the field using the information included in the image. Based on the determined features and objects, the farming machine 100 can execute various actions (e.g., a plant treatment) as described herein.

Figure 2A:
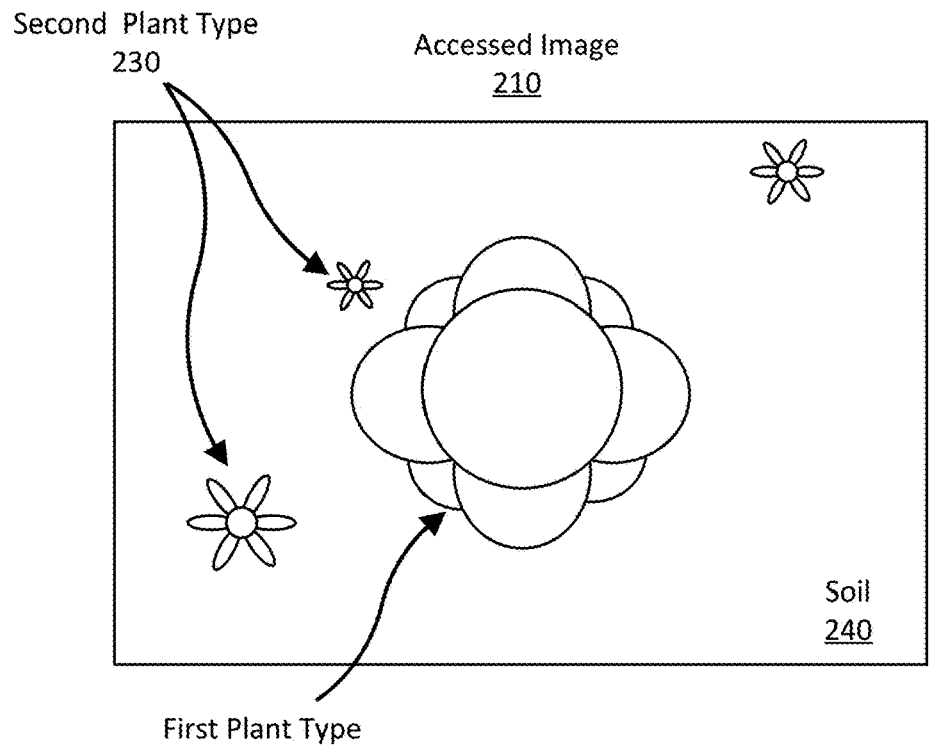
FIG. 2A is an illustration of an image accessed by the control system, according to one example embodiment.

FIG. 2A is an illustration of an image accessed by the control system (i.e., accessed image), according to one example embodiment. The accessed image 210 is obtained by a detection mechanism 110 coupled to a farming machine 100 as the farming machine 100 travels through a field. The accessed image 210 is obtained in ideal operating conditions (e.g., a bright, sunny day). The accessed image 210 includes information representing a single plant of a first type 220, three plants a second type 230, and soil 240 in the field.

Figure 2B:
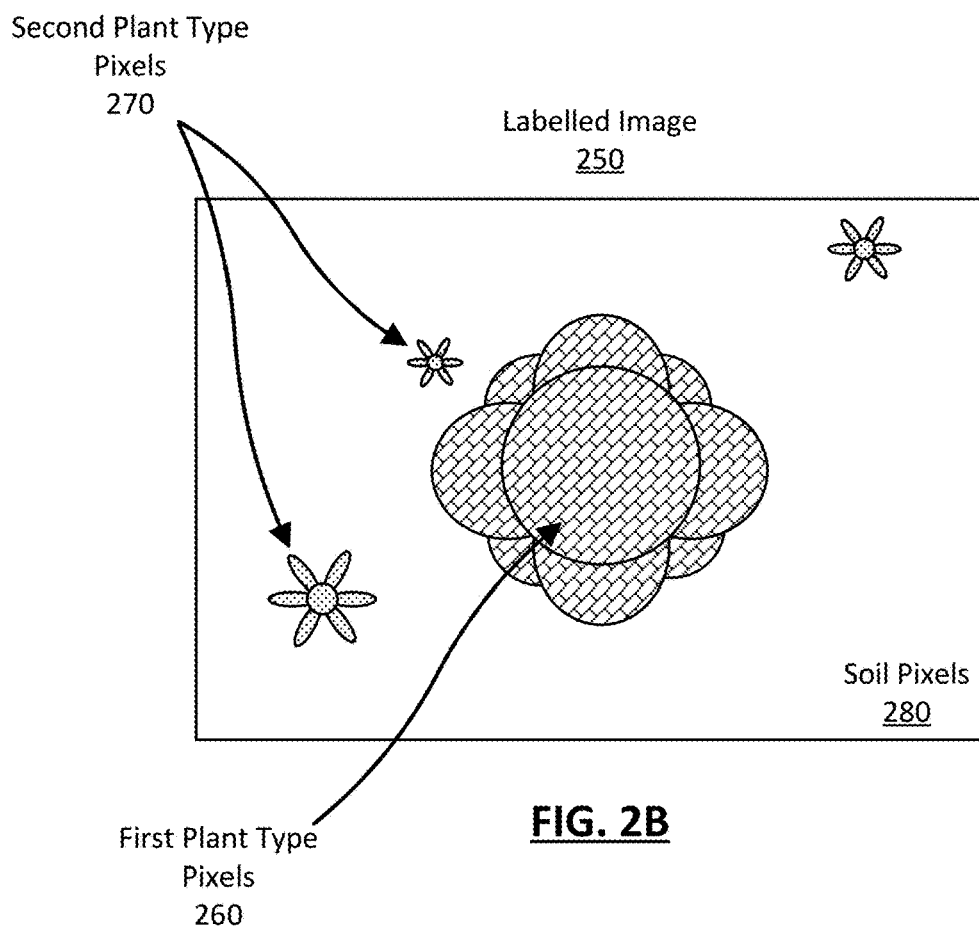
FIG. 2B is an illustration of a labelled image, according to one example embodiment.

FIG. 2B is an illustration of a labelled image, according to one example embodiment. A labelled image is an accessed image after it has been processed by the control system to label features and objects. In this example, the labelled image 250 is the accessed image 210 of FIG. 2A after the control system 130 labels its pixels using a machine learning model. As illustrated, the labelled image 250 includes pixels the control system 130 identifies as representing the first type of plant 260, the second type of plant 270, and the soil 280. Pixels labelled as the first type of plant 260 are illustrated with a dotted fill, pixels labelled as the second type of plant 270 are illustrated with a hatched fill, and pixels labelled as soil 280 are illustrated with no fill. In some examples, the control system 130 may not label pixels representing soil and only label pixels representing plant matter ("plant pixels").

Together, FIG. 2A and FIG. 2B illustrate an example process of a control system 130 labelling pixels of an accessed image 210 obtained in ideal operating conditions. However, in some instances, a farming machine 100 operates in operating conditions that are non-ideal for correctly identifying and treating plants. For example, some non-ideal operating conditions may include: inclement weather, low light conditions (e.g., sunrise and/or sunset), night conditions where external illumination is required, dusty conditions, windy conditions, etc. More generally, non-ideal operating conditions are operating conditions that affect the precision and accuracy of the plant identification model implemented by the control system 130. For example, consider a control system 130 executing a pixelwise semantic segmentation model configured to identify various types of plants in the field using accessed images ("plant identification model"). In this case, the plant identification model is trained using previously labelled images obtained by a farming machine operating in a field during ideal operating conditions. Accordingly, the plant identification model is more accurate and precise at identifying plants when accessed images are obtained during similar ideal operating conditions, and, conversely, less accurate and precise when identifying plants when the accessed images are obtained during non-ideal operating conditions (e.g., windy).

Figure 3A:
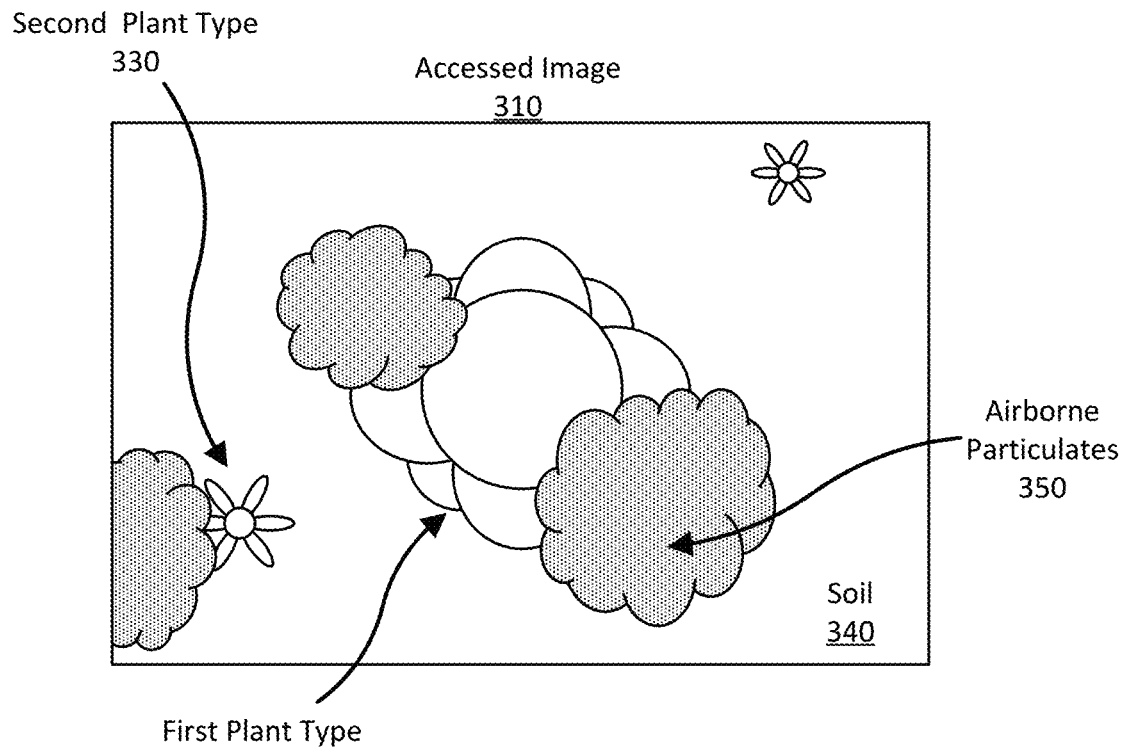
FIG. 3A is an illustration of an accessed image including airborne particulates, according to one example embodiment.
Figure 3B:
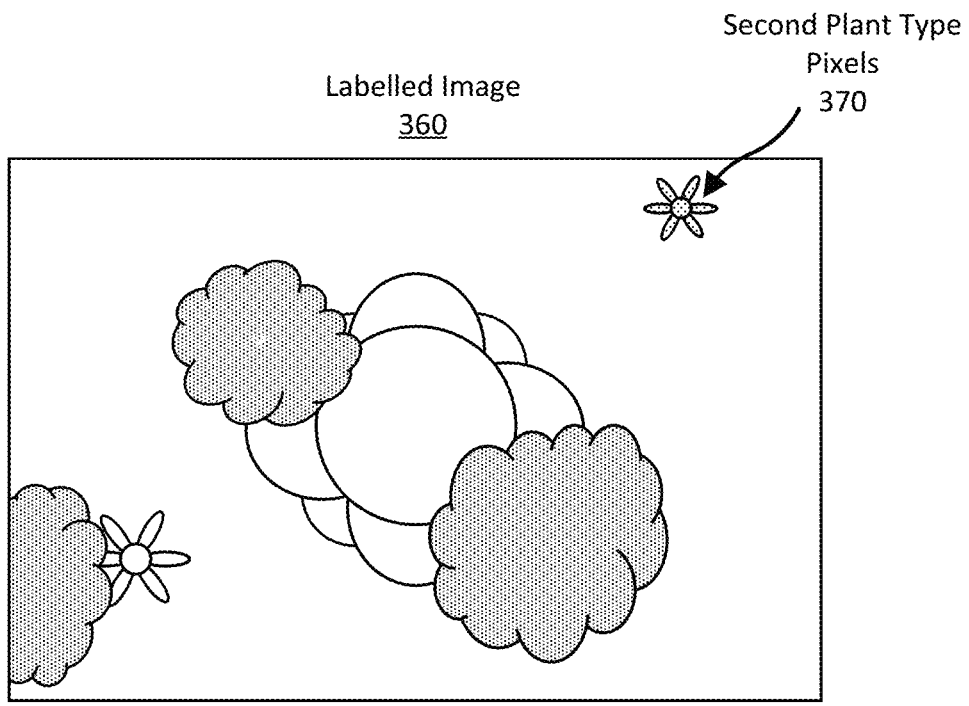
FIG. 3B is an illustration of a labelled image including airborne particulates, according to one example embodiment.

To demonstrate, FIG. 3A and FIG. 3B illustrate an example process of a control system 130 labelling pixels of an accessed image obtained in non-ideal operating conditions. FIG. 3A is an illustration of an accessed image, according to one example embodiment. The accessed image 310 is obtained by a detection mechanism 110 coupled to a farming machine 100 as the farming machine 100 travels through a field. The accessed image 310 includes the same area of field as the accessed image 210 and, under ideal conditions, should include the same information. However, in this example, the farming machine 100 is operating in non-ideal operating conditions (e.g., windy) and the accessed image 310 includes information representing airborne particulates 350. The airborne particulates 350 are illustrated as small cloud like shapes, however, in other accessed images, airborne particulates may not take a defined shape. The accessed image 310 also includes information representing a single plant of a first type 320, two plants a second type 330, and soil 340 in the field. Notably, portions of the plant of the first type 320, a portion of a plant of the second type 330, and an entire plant of the second type (referring to accessed image 210) are obscured from view by the airborne particulates 350. In other examples, the airborne particulates may cause objects (e.g., plants) in an accessed image to appear fuzzy, out of focus, darker, striated, etc.

FIG. 3B is an illustration of a labelled image, according to one example embodiment. In this example, the labelled image 360 is the accessed image 310 of FIG. 3A after the control system 130 labels its pixels using a plant identification model. Here, because the plant identification model is configured to identify plants in ideal operating conditions, many of the pixels in the labelled image 360 are mislabeled or unlabeled. As illustrated, the labelled image 360 includes pixels the control system 130 identifies as representing the second type of plant 370 (again illustrated with a dotted fill), but for only one of the second type of plants. The labelled image 360 does not include pixels labelled as the first type of plant, nor all the pixels that should be labelled as the second type. The control system 130 mislabels many of the pixels because the airborne particulates 350 are obscuring some portion (or all) of the plant matter in the accessed image 310. In other words, a pixel, or group of pixels, representing plant matter in the accessed image 310 is obscured by a pixel, or group of pixels, representing airborne particulates. For convenience, herein, the pixels are defined as "obscuring pixels." Obscuring pixels obscure objects of interest (e.g., plants) in an accessed image and, thereby, increase the difficulty of accurately and precisely identifying plants in the image.

IV. Treating Identified Plants

A control system 130 uses labelled images to treat plants in the field. To do so, the control system 130 generates a mapped image from the labelled image, and creates a treatment map based on the mapped image. A mapped image maps a labelled image to a real-world area of a field where the image was obtained. A treatment map is a mapped image in which regions (i.e., pixel groups) in the mapped image correspond to treatment areas 122 of treatment mechanisms 120 of a farming machine 100. The farming machine 100 actuates treatment mechanisms 120 when its corresponding treatment area 122 in a treatment map includes an appropriate object (e.g., a plant).

Figure 4A:
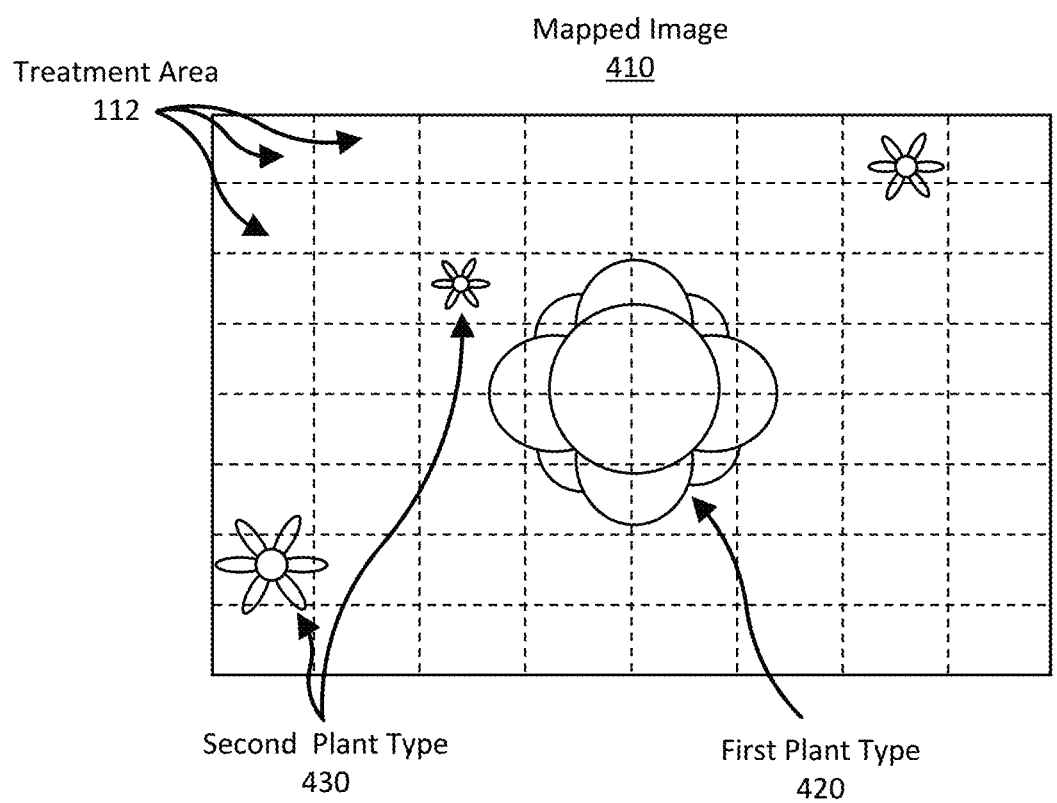
FIG. 4A is an illustration of a mapped image, according to one example embodiment.
Figure 4B:
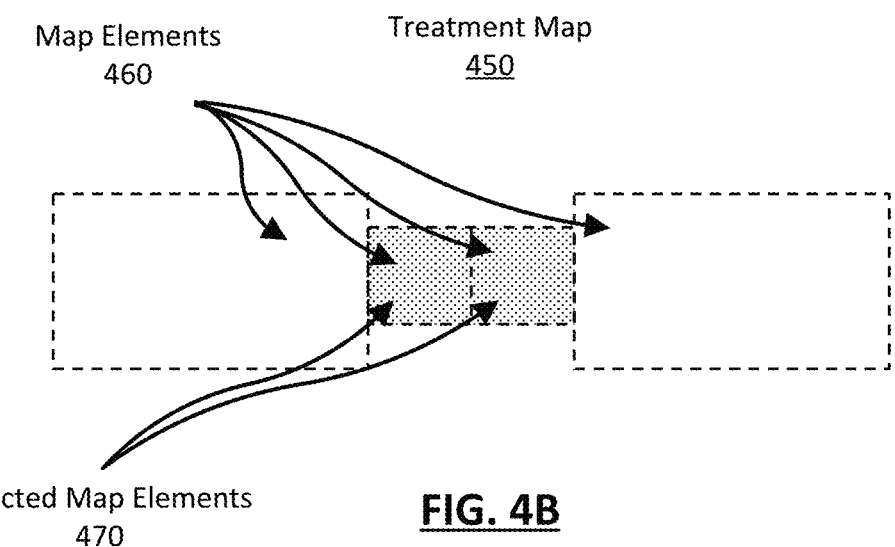
FIG. 4B is an illustration of a treatment map, according to one example embodiment.

FIGS. 4A and 4B illustrate a mapped image and a treatment map. For convenience, the mapped image and treatment map are generated by a farming machine 100 operating in ideal operating conditions. However, the process of generating a mapped image and treatment map are similar in non-ideal operating conditions.

FIG. 4A is an illustration of a mapped image, according to one example embodiment. The control system 130 identifies and labels groups of pixels as the first type of plant 420 and the second type of plant 430 using a plant identification model. The control system 130 then generates the mapped image 410 by mapping the labelled image to a real-world area of the field. In the illustrated image, each treatment area 122 of a treatment mechanism 120 corresponds to a region of pixels in the mapped image 410. The treatment areas 122 are represented in the mapped image as small rectangles, but could be other shapes and sizes according to the configuration of the treatment mechanisms 120.

FIG. 4B is an illustration of a treatment map, according to one example embodiment. In this example, the treatment map 450 is generated from the mapped image 410 in FIG. 4A. Here, the control system 130 is configured to generate a treatment map that treats plants of the first type 420 as the farming machine 100 travels past the identified plants in the field. The treatment map 450 includes several map elements 460, with each map element corresponding to one or more treatment areas in the mapped image 410. Each map element is also associated with the treatment mechanism 120 corresponding to the treatment areas 122 of the map elements 460. For example, the center two map elements 460 of the treatment map 450 correspond to the center two treatment areas 122 in the mapped image 410. Two of the map elements 460 in the treatment map 450 are selected map elements 470. Selected map elements 470 are map elements 460 corresponding to treatment areas 122 in the mapped image 410 including pixels identified, for example, as the first type of plant 420. The farming machine 100 applies a treatment to treatment areas 122 corresponding to the selected map elements 470 with their associated treatment mechanism 120. For example, the farming machine applies a treatment to the first plant type 420 using the treatment mechanisms 120 associated with the selected map elements 470.

A more detailed description of identifying plants in an accessed image, creating a mapped image, and generating a treatment map may be found in U.S. patent application Ser. No. 16/126,842 titled "Semantic Segmentation to Identify and Treat Plants in a Field and Verify the Plant Treatments," filed on Sep. 10, 2018.

V. Plant Identification Models

There are several methods to identify plants in an accessed image. Pixelwise semantic segmentation is a general identification method that, when applied to the problem of identifying plants, may be faster and more accurate than other plant identification methods. Pixelwise semantic segmentation models are a subset of deep learning methods that operate on fully convolutional encoder-decoder network. Additionally, a pixelwise semantic segmentation model may be configured to identify plants in both ideal and non-ideal operating conditions. For example, a pixelwise semantic segmentation model can be trained to identify plants using accessed images which include pixels representing both plant matter and airborne particulates. Further, the pixelwise semantic segmentation model may be trained to identify a particulate level in an accessed image.

Figure 5:
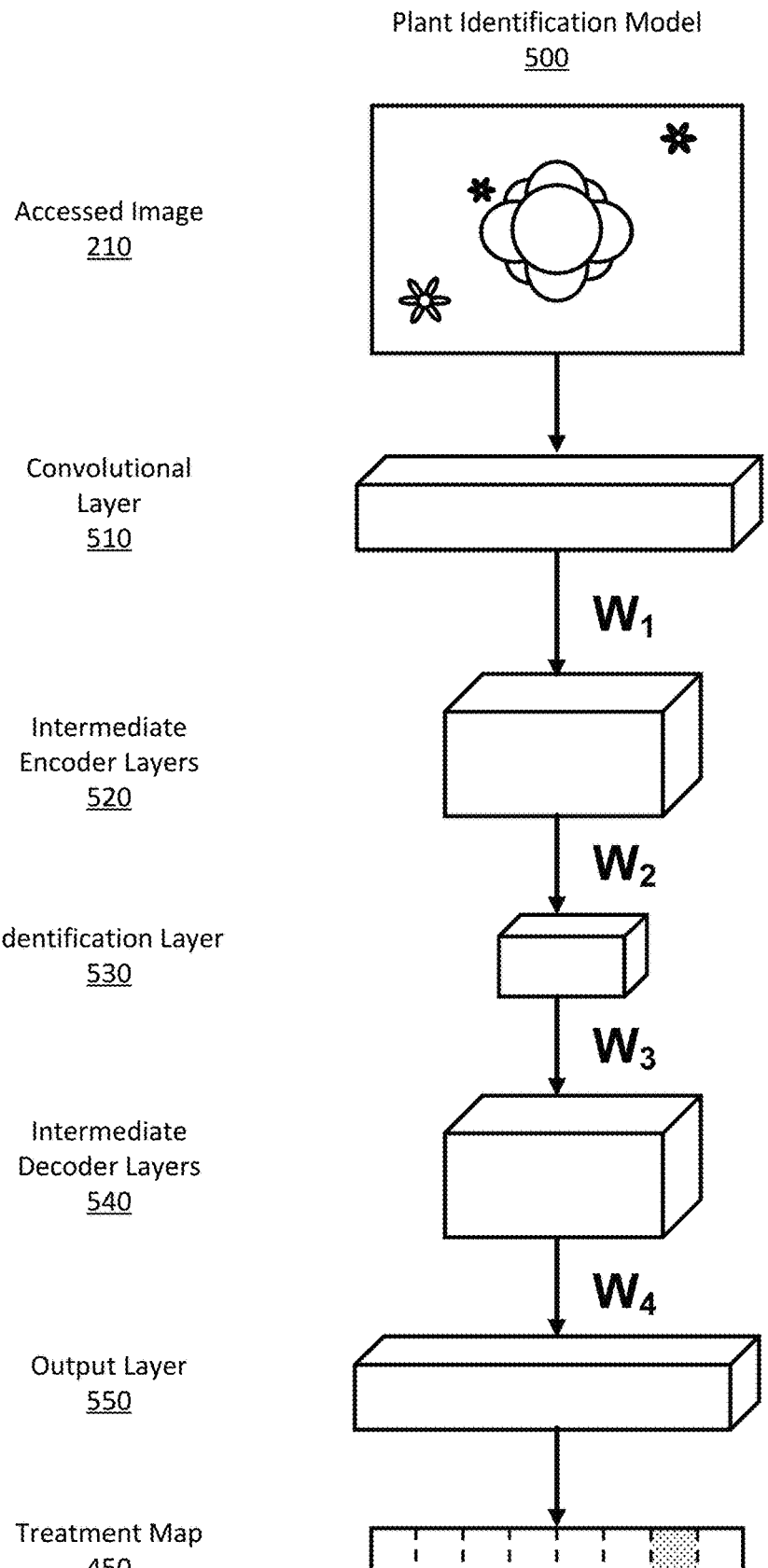
FIG. 5 is a representation of a plant identification model based on accessed images and previously identified plants, according to one example embodiment.

Semantic segmentation may be implemented by a control system 130 using a plant identification model. A farming machine 100 can execute the plant identification model to identify features (e.g., plants, particulates, soil, etc.) in an accessed image (e.g., accessed image 210) and quickly generate an accurate treatment map. FIG. 5 is a representation of a plant identification model based on accessed images and previously identified plants, according to one example embodiment. As described in greater detail below, the plant identification model can identify plants in both ideal and non-ideal operating conditions. The previously identified plants may have been identified by another plant identification model or a human identifier.

In the illustrated embodiment, referred to throughout the remainder of the specification, the plant identification model 500 is a convolutional neural network model with layers of nodes, in which values at nodes of a current layer are a transformation of values at nodes of a previous layer. A transformation in the model 500 is determined through a set of weights and parameters connecting the current layer and the previous layer. For example, as shown in FIG. 5, the example model 500 includes five layers of nodes: layers 510, 520, 530, 540, and 550. The control system 130 applies the function $W_1$ to transform from layer 510 to layer 520, applies the function $W_2$ to transform from layer 520 to layer 530, applies the function $W_3$ to transform from layer 530 to layer 540, and applies the function $W_4$ to transform from layer 540 to layer 550. In some examples, the transformation can also be determined through a set of weights and parameters used to transform between previous layers in the model. For example, the transformation $W_4$ from layer 540 to layer 550 can be based on parameters used to accomplish the transformation $W_1$ from layer 510 to 520.

The control system 130 inputs an accessed image 210 (or a mapped image 410) to the model 500 and encodes the image onto the convolutional layer 510. After processing by the control system 130, the model 500 outputs a treatment map 450 decoded from the output layer 550. The control system 130 employs the model 500 to identify latent information in the accessed image 210 representing plants and obscuring pixels in the identification layer 530. The control system 130 reduces of the dimensionality of the convolutional layer 510 to that of the identification layer 530 to identify the plants and particulates, and then increases the dimensionality of the identification layer 530 to generate a treatment map 450.

As previously described, the control system 130 encodes the accessed image 210 to a convolutional layer 510. In one example, accessed image is directly encoded to the convolutional layer 510 because the dimensionality of the convolutional layer 510 is the same as a pixel dimensionality (e.g., number of pixels) of the accessed image 210. In other examples, the accessed image 210 can be adjusted such that the pixel dimensionality of the accessed image 210 is the same as the dimensionality of the convolutional layer 510. For example, the accessed image may be cropped, reduced, scaled, etc.

The control system 130 applies the model 500 to relate accessed images 210 in the convolutional layer 510 to plant and particulate identification information in the identification layer 530. The control system 130 retrieves relevance information between these elements can by applying a set of transformations (e.g., $W_1$, $W_2$, etc.) between the corresponding layers. Continuing with the example from FIG. 5, the convolutional layer 510 of the model 500 represents an encoded accessed image 210, and identification layer 530 of the model 500 represents plant and particulate identification information. The control system 130 identifies plants and particulates in an accessed image 210 by applying the transformations $W_1$ and $W_2$ to the pixel values of the accessed image 210 in the space of convolutional layer 510. The weights and parameters for the transformations may indicate relationships between information contained in the accessed image and the identification of a plant and/or particulates. For example, the weights and parameters can be a quantization of shapes, colors, obscuration, etc. included in information representing plants and/or particulates included in an accessed image 210. The control system 130 may learn the weights and parameters using historical user interaction data. For example, the control system can access plant identification submitted by users and particulate information created by a dust generation model.

In one example, the weights and parameters for plant and particulate identification can be collected and trained using data collected from previously accessed images 210 and a labelling process. The labelling process reduces the amount of time required by the control system 130 employing the model 500 to identify pixels representing plants while also increasing the accuracy of identified pixels. The labelling process can include: identifying a bounding box including pixels likely to represent a plant, identifying green pixels within the bounding boxes, identifying a contour around the identified green pixels, using the contours to create a label set for the accessed image, and sending the labelled image to users for verification. Users verify labels by identifying which pixels are green near the contours in an accessed image rather than an entire image. In effect, this "pre-identification" by model 500 reduces the number of pixels needed to be verified by a human and reduces the costs of training the semantic segmentation model 500.

In another example, the weights and parameters for plant and particulate identification can be collected and trained using data collected from a particulate augmentation model. An example particulate augmentation model is described in more detail below.

Plants in the accessed image 210 are identified in the identification layer 530. A particulate level (or airborne particulates) in the accessed image is also identified in the identification layer 530. The identification layer 530 is a data structure representing identified plants and particulate levels based on the latent information about the plants and particulates represented in the accessed image 210.

As described previously, identified plants in an accessed image 210 can be used to generate a treatment map 450. To generate a treatment map 450, the control system 130 employs the model 500 and applies the transformations $W_3$ and $W_4$ to the values of the identified plants and particulate level in identification layer 530. The transformations result in a set of nodes in the output layer 550. The weights and parameters for the transformations may indicate relationships between identified plants and a treatment map 450. In some cases, the control system 130 directly outputs a plant treatment map 450 from the nodes of the output layer 550, while in other cases the control system 130 decodes the nodes of the output layer 550 into a treatment map 450. That is, model 500 can include a conversion layer (not illustrated) that converts the output layer 550 to a treatment map 450.

To illustrate conversion, take, for example, a control system 130 employing model 500 that produces an output image at output layer 550. The output image may include an arbitrary set of pixels marked to indicate the presence of a plant. The control system 130 generates a treatment map 450 by employing a conversion layer that converts the output image into a set of treatment areas 122 corresponding to treatment mechanisms 120 of the farming machine 100 (i.e., a treatment map). Other methods of a conversion layer generating a treatment map 450 are also possible.

Here, the control system 130 outputs a treatment map in a manner dissimilar to that of a traditional encoder/decoder scheme. Generally, the output layer 550 of a traditional convolutional neural network has the same, or nearly the same, dimensionality as the convolutional layer 510. That is, given the example of an accessed image 210 as an input, the convolutional layer 510 and the output layer 550 both have the pixel dimensionality. This allows a convolutional neural network to identify objects in an accessed image 210 and map them back to the original input accessed image 210. Traditionally, decoding objects identified in the identification layer 530 to an image having the same dimensionality as the convolutional layer 510 is computationally expensive and requires additional processing time. In this example, the dimensionality of the treatment map 450 is the treatment dimensionality (e.g., the number of treatment mechanisms) of a farming machine 100. Generally, the treatment dimensionality (e.g., 1x 30 treatment mechanisms) is much less than the pixel dimensionality (e.g., 2580×3540 pixels) and, therefore, decoding the identified plants in the identification layer 530 to a treatment map requires fewer transformations and less processing time.

Identified particulates (or particulate level) can be used to generate a particulate level notification. Similarly, to above, the control system employs model 500 and applies transformations $W_3$ and $W_4$ to the values of identified particulates and the corresponding particulate level in identification layer 530. In this case, the transformation may result a particulate level for the accessed image 210. For example, the particulate level may be "high" if a threshold proportion (or number) of pixels in the image are identified as obscuring pixels. In another example, the particulate level may be "30%" if the model 500 employs a particulate augmentation image including a particulate level of 30%. In another example, applying transformations $W_3$ (and/or $W_4$) may not be necessary depending on the desired resolution. To illustrate, it may not be necessary to determine a particulate level for every pixel in an image. In another example, the model may include a convolutional layer (i.e., cony 1×1) configured to reduce the dimensionality of the image to, for example, N and classify the particulate level of the whole image rather than individual pixels. To illustrate, the convolutional layer reduces the image to a dimensionality of 10. In this case, the convolutional layer determines that the particulate level is 0%, 10%, 20%, etc. Determining particulate levels is described in greater detail below.

Additionally, the model 500 can include layers known as intermediate layers. Intermediate layers are those that do not correspond to an accessed image 210, plant identification, or a treatment map 450. For example, as shown in FIG. 5, layers 520 are intermediate encoder layers between the convolutional layer 510 and the identification layer 530. Layer 540 is an intermediate decoder layer between the identification layer 530 and the output layer 550. Hidden layers are latent representations of different aspects of a plant that are not observed in the data, but may govern the relationships between the elements of an image when identifying a plant. For example, a node in the hidden layer may have strong connections (e.g., large weight values) to input values and identification values that share the commonality of "green leaves." As another example, another node in the hidden layer may have strong connections to input values and identification values that share the commonality of "airborne particulate in front of a plant." Specifically, in the example model of FIG. 5, nodes of the hidden layers 520 and 540 can link inherent information in the accessed image that share common characteristics to help determine if that information represents a plant in the accessed image.

Additionally, each intermediate layer is a combination of functions such as, for example, residual blocks, convolutional layers, pooling operations, skip connections, concatenations, etc. Any number of intermediate encoder layers 520 can function to reduce the convolutional layer to the identification layer and any number of intermediate decoder layers 540 can function to increase the identification layer 530 to the output layer 550. Alternatively stated, the encoder intermediate layers reduce the pixel dimensionality to the identification dimensionality, and the decoder intermediate layers increase the identification dimensionality to the treatment dimensionality.

Furthermore, in various embodiments, control system 130 employs the functions of model 500 to reduce the accessed image 210 and identify any number of objects in a field. The identified objects are represented in the identification layer 530 as a data structure. In various examples, the model can be configured to identify a location of a plant, a condition of a plant, a type of a plant, a category of a plant (e.g., a weed or a crop), or any other characteristics of a plant in the field. In various other embodiments, the identification layer can identify latent information representing other objects in the accessed image. For example, the identification layer 530 can identify a result of a plant treatment, soil, an obstruction, or any other object in the field.

VI. Plant Identification to Control Plant Treatments

A farming machine 100 operating in a field employs a plant identification model (e.g., model 500) to identify plants and/or a particulate level in the field using accessed images of the field obtained by the farming machine. The model 500 is configured to identify plants and/or particulate levels in accessed images obtained by the farming machine 100 in both ideal and non-ideal operating conditions.

To do identify and treat plants, a control system 130 inputs an accessed image 210 into the model 500 and generates a treatment map (e.g., treatment map 450). The treatment map 450 includes selected map elements 460 for treatment by treatment mechanisms 120 of the farming machine 100. The selected map elements 470 are treatment areas 122 in the accessed image 210 which include an identified plant. The farming machine 100 treats the identified plants by actuating treatment mechanisms 120 at the appropriate time as the farming machine travels past the plant in the field. Additionally, the control system 130 employs the model 500 to determine a particulate level in the field where the farming machine is operating. Based on the determined particulate level, the farming machine 100 provides feedback to an operator regarding the determined particulate level.

Figure 6:
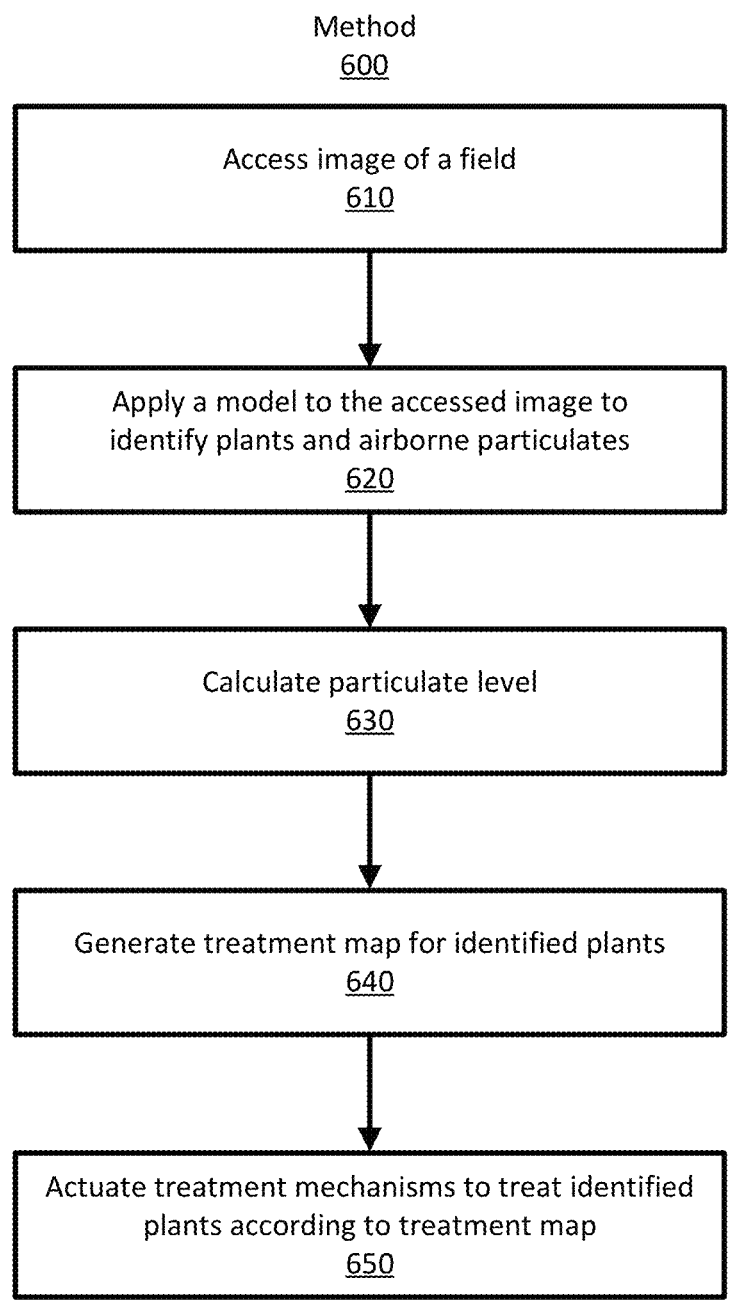
FIG. 6 is a flow diagram illustrating a method for the identification and treatment of weeds in a cotton field despite the presence of airborne particulates, according to one example embodiment.

FIGS. 6 and 7 illustrate a specific example of a farming machine 100 identifying and treating plants using plant treatment mechanisms 120 as the farming machine 100 travels through the field. The farming machine 100 is operating in non-ideal operating conditions and airborne particulates are present in the field. The farming machine 100 determines a particulate level for the field and generates a notification based on a determined particulate level. In this example, the farming machine 100 is a crop sprayer operating in a field planted with cotton (e.g., first plant type 220). The farming machine is configured to identify weeds (e.g. second plant type 230) in the field and treat the identified weeds by spraying them with an herbicide. The farming machine 100 is configured with a single row of eight spray nozzles that serve as treatment mechanisms 120. That is, the spray nozzles spray an herbicide when actuated by the farming machine 100. The farming machine 100 includes a detection mechanism 110 that captures images of plants and airborne particulates in the field as the farming machine 100 travels down the cotton crop rows. Further, the farming machine 100 includes a control system 130 that identifies plants and particulates in the field and controls the spray nozzles.

FIG. 6 is a flow diagram illustrating a method for the identification and treatment of weeds in a cotton field despite the presence of airborne particulates in the cotton field, according to one example embodiment. The method 600 can include additional or fewer steps and the illustrated steps may be accomplished in any order. In some cases, steps may be repeated any number of times before progressing to a subsequent step.

The farming machine 100 images an area of the field using the detection mechanism 110. The image includes information representing cotton plants, weed plants, airborne particulates, and soil in the field. In this example, the detection mechanism 110 is mounted to the front of the farming machine 100 such that the area of the field is imaged before the front end of the farming machine 100 passes over the area. The detection mechanism 110 transmits the image to the control system 130 of the farming machine 100.

Figure 7A:
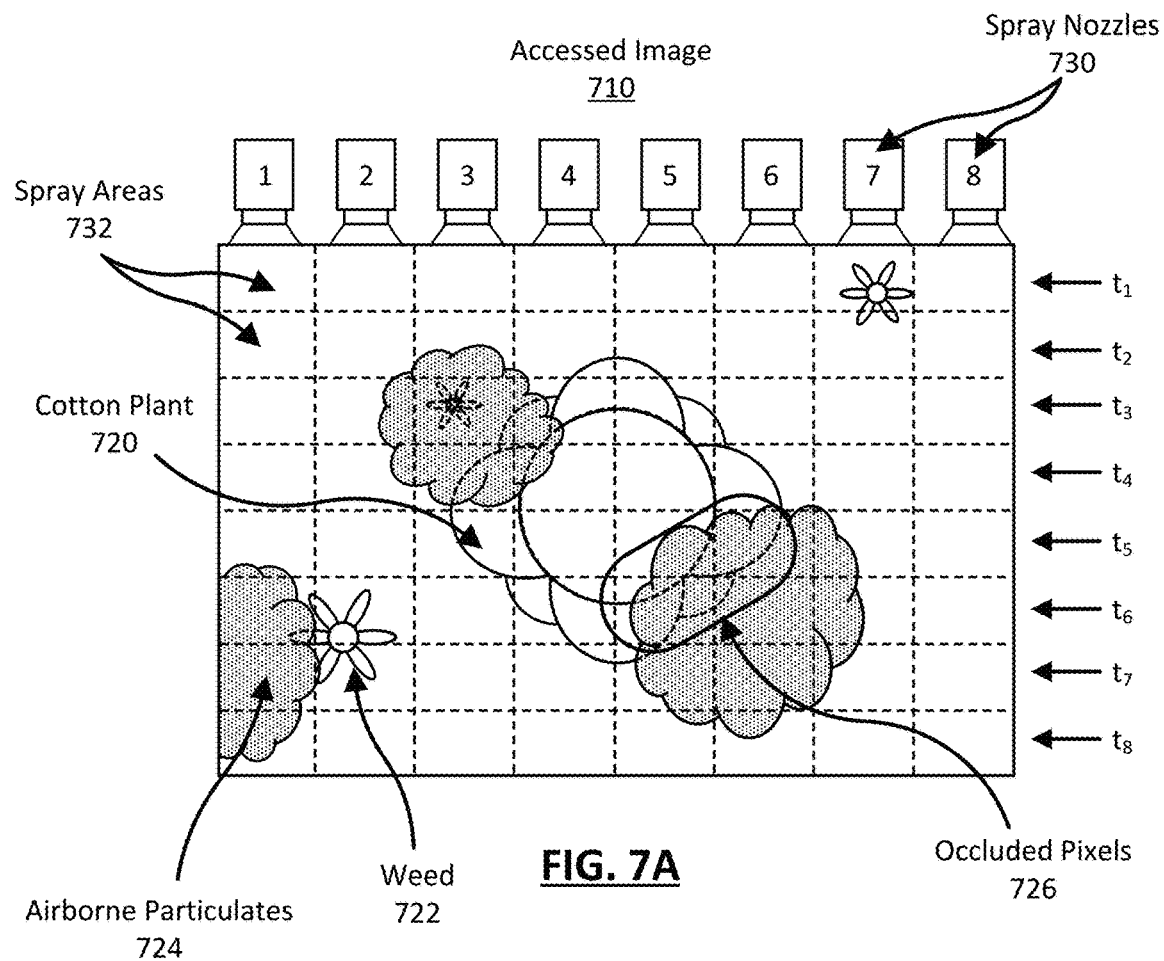
FIG. 7A is an illustration of an accessed image, according to one example embodiment.

The control system 130 accesses 610 the image, and the information included therein, from the detection mechanism 110. FIG. 7A is an illustration of an accessed image, according to one example embodiment. The accessed image 710 includes a cotton plant 720 near the center of the image and several weeds 722 spaced about the cotton plant 720.

The accessed image 710 also includes airborne particulates 724 which are illustrated as, for example, small clouds. For convenience, the treatment areas (e.g., treatment area 122) of the treatment mechanisms for the farming machine 100 are overlaid on the accessed image 710. In this case the treatment mechanisms include an array of spray nozzles 730 and the treatment areas for the spray nozzles are spray areas 732. Spray nozzles 730 labeled 1 to 8 are pictured above the accessed image 710 and correspond to the spray areas 732 in the columns below them.

In this example, the spray areas 732 are shown for eight different treatments of the spray nozzles 730 from time $t_1$ through $t_8$. Thus, each row of illustrated spray areas 732 corresponds to one treatment of the spray areas 732 in that row by the farming machine 100 at a time. In other words, over time, as the farming machine 100 moves through the field, the spray nozzles 730 and their corresponding spray areas 732 move down the accessed image 710 and the farming machine 100 treat weeds 722 when appropriate.

Returning to FIG. 6, the control system 130 applies 620 a model (e.g., model 500) to identify pixels in the accessed image 710 representing plants (e.g., cotton plant 720, and/or weeds 722) and/or airborne particulates 724. The control system 130 encodes the accessed image 210 onto a convolutional layer 510 of the model 500. Each pixel of the accessed image 210 corresponds to a single node of the convolutional layer 510. The control system 130 applies a set of transformations to the convolutional layer 510 to identify plants (e.g., cotton plant 720, and weeds 722) and/or airborne particulates 724 in the accessed image 210. Each transformation identifies latent information in the pixels that represents the plants and/or particulates.

In some configurations, the control system 130 identifies one or more of the pixels as occluding pixels, i.e., a pixel representing an airborne particulate 724 that occludes a plant in the accessed image 710. In an embodiment, the control system 130 may identify the occluding pixel as a pixel representing the occluded plant. For example, referring to FIG. 7A, a group of pixels representing the cotton plant 720 may be at least partially occluded. Some occluded pixels 726 are highlighted near the bottom right of the cotton plant 720 where some airborne particulates 724 are illustrated as overlapping a portion of the cotton plant 720.

While identifying plants and/or airborne particulates, control system 130 applies various functions and transformations that reduce the dimensionality of convolutional layer 510. The transformations reduce the convolutional layer 510 to the identification layer 530. Generally, the dimensionality of the identification is much smaller than the convolutional layer 510. In this example, the identification layer 530 is configured as a data structure including identified weeds, cotton, and airborne particulates.

The control system 130 calculates 630 a particulate level in the accessed image 710. In this example, the control system determines that the particulate level is high because a ratio of a number pixels representing airborne particulates 724 to the total pixels in an accessed image 710 is greater than a threshold. In another example, the control system 130 determines a particulate level based on a particulate threshold pixel level. For example, if a threshold number of pixels have a particulate level above a particulate threshold level, the control system determines the particulate level for the accessed image is a ratio many pixels representing airborne particulates 724 to a total number of pixels in an accessed image 710. In another example, the control system determines a particulate level for an accessed image by averaging a particulate value (e.g., alpha-blend level) for each pixel in the accessed image. Other methods to determine a particulate level are also possible, several of which are described herein.

The control system 130 generates a notification for the operator of the farming machine 100 indicating the particulate level in the field. For some particulate levels, the control system 130 can provide a recommendation to the operator to reduce the particulate level. For example, the control system 130 may recommend that the operator reduce the speed of the farming machine to decrease the particulate level.

The control system 130 generates 640 a treatment map (e.g., treatment map 450). To generate the treatment map, the control system applies a set of transformations to the identification layer 530. Each transformation increases the dimensionality of the identification layer 530 and decodes the identified plants (and/or airborne particulates) to a new dimensionality. The set of transformations increases the dimensionality of the identification layer to that of the output layer 550.

In this example, the output layer 550 has the same dimensionality as the treatment dimensionality (e.g., an output layer of 1×8 nodes corresponding to a 1×8 arrays of treatment mechanisms) such that the output layer 550 can represent a treatment map. That is, each node of the output layer 550 corresponds to a map element (e.g., map element 460) of a treatment map and, thereby, a spray area 732 of a spray nozzle 730 of the farming machine 100. Further, each node also includes information regarding objects identified in that spray area 732 (e.g., a weed 722, or cotton 720). As such, the control system 130 decodes the nodes of the output layer into a treatment map. In this example, the control system 130 generates a treatment map indicating that for each map element of a treatment map including an identified weed, the farming machine 100 actuates the corresponding spray nozzle 730 to spray herbicide in the appropriate spray area 732.

Figure 7B:
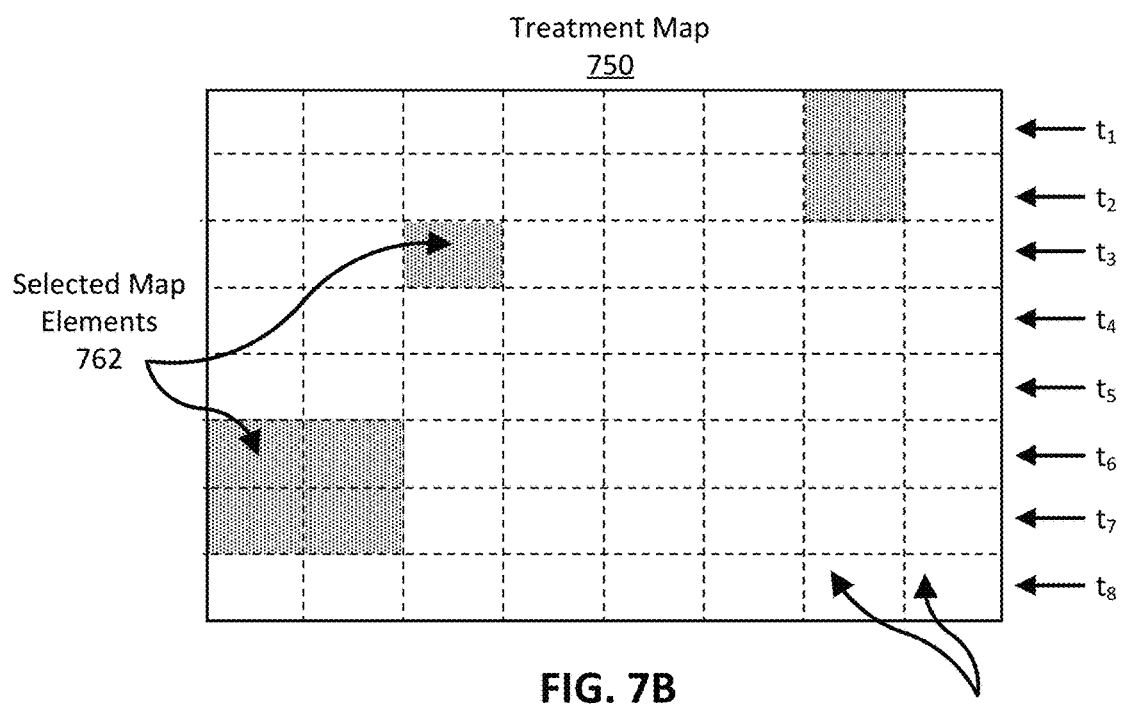
FIG. 7B is an illustration of a treatment map, according to one example embodiment.

FIG. 7B is an illustration of a treatment map, according to one example embodiment. The treatment map 750 includes map elements 760 corresponding to similarly positioned spray areas 732 of FIG. 7A. The treatment map 750 also includes selected map elements 762 which correspond to spray areas 732 that included information representing a weed 722 in the accessed image 710. Selected map elements 760 will be treated by the farming machine 100 at the appropriate time as it travels through the field. Notably, the control system 130 generates an accurate treatment map for the weeds 722 despite the presence of airborne particulates 724 in the accessed image 710.

Returning to FIG. 6, the farming machine 100 actuates 650 spray nozzles 730 to spray the spray areas 732 and treat the weeds 722 as the farming machine 100 travels through the field. To do so, the control system 130 generates control signals for the spray nozzles 730 and actuates the spray nozzles 730 corresponding to selected map elements 762 areas in the treatment map 750 at the appropriate time.

For example, turning to FIGS. 7A and 7B, at time $t_1$ the treatment map 750 indicates a selected map element 762 in the $7^{th}$ column because the corresponding spray area 732 for the $7^{th}$ spray nozzle 730 at time $t_1$ included pixels representing a weed 722. As such, the farming machine 100 actuates the $7^{th}$ spray nozzle 730 at time $t_1$ to treat the weed 722 in the corresponding spray area 732 as the farming machine 100 travels through the field.

The process continues as the farming machine 100 travels through the field. As the farming machine 100 moves, the model 500 generates the appropriate treatment maps 450 to spray herbicide on weeds 722 and not cotton 720. For example, continuing from time $t_1$, the farming machine 100 actuates the $7^{th}$ treatment mechanism 120 at time $t_2$, the $3^{rd}$ treatment mechanism 120 at time $t_3$, the $1^{st}$ and $2^{nd}$ treatment mechanism 120 at time $t_6$, and the $1^{st}$ and $2^{nd}$ treatment mechanism at time $t_7$.

VII. Particulate Augmentation of Plant Identification Models

As described above, in non-ideal operating conditions a control system 130 may misidentify plants in an accessed image. For example, airborne particulates may obscure a plant such that their corresponding pixels in an accessed image are obscuring pixels. If a control system 130 employs a plant identification model configured to identify plants in ideal operating conditions, obscuring pixels may affect the accuracy and/or precision of the control system 130 identifying plants. Therefore, a control system 130 employing a plant identification model configured to identify a plant in non-ideal operating conditions is beneficial to establish more reliable plant identification in a wider range of operating conditions. For example, a plant identification model configured to identify plants in the presence of airborne particulates would allow a farming machine to operate at higher rates of travel (which generates more airborne particulates), during windy conditions, etc. However, training a plant identification model to identify plants in non-ideal operating conditions is a challenging problem. Herein, for convenience, training the plant identification model is described as occurring on the control system 130. However, in various embodiments, a system other than the control system may train the plant identification model such that it may be implemented on the control system 130.

In an example, a plant identification model can be trained to identify plants in non-ideal operating conditions using accessed images obtained by a farming machine in non-ideal operating conditions that are subsequently labelled by a human. For example, a farming machine may obtain images of plants in a field while it is windy such that there are airborne particulates obscuring plants in the images. A human then labels plants in the image (even if they are obscured) and those labelled images are used to train a plant identification model. However, this approach is problematic for several interrelated reasons: (i) each non-ideal operating condition necessitates additional training for a plant identification model, (ii) human labelling of images for training a plant identification model is expensive, and (iii) humans may mislabel plants in the presence of obscuring pixels, which, in turn, may lead to poor plant classification outputs from a plant identification model. Take, for example, airborne particulates in an image due to windy conditions. The number of airborne particulates in an image may vary greatly depending on the amount of wind (e.g., a breeze, or a gale). In these circumstances, a plant identification model trained using labelled images in slightly windy operating conditions may not be able to accurately identify plants in very windy operating conditions. As such, a wide range of training images are required to train a plant identification for the varied wind conditions a farming machine might experience. Obtaining such a vast number of images and subsequently labelling them to train a plant identification model is incredibly expensive and impractical.

In another example, a plant identification model can be trained to identify plants in non-ideal operating conditions using accessed images obtained by a farming machine in ideal operating conditions, labelled by a human, and subsequently augmented with a simulation of non-ideal operating conditions. For example, a farming machine may obtain images of plants in a field on a bright, sunny day where there are few airborne particulates obscuring the plants in the images. A human then labels the plants in the image. A computer (e.g., control system 130) employs a particulate augmentation model to generate an augmented image. An augmented image is a labelled image in which a non-ideal operating condition is simulated. For example, the control system 130 may simulate windy conditions by introducing simulated airborne particulates to a labelled image. The augmented image is used to train a plant identification model to identify plants in non-ideal operating conditions. Beneficially, the control system 130 may simulate a variety of windy conditions for the same accessed image. For example, the control system 130 may simulate airborne particulates for non-ideal operating conditions from, for example, slightly breezy to gale force winds. This example approach provides a more cost-effective method to train a plant identification model in non-ideal operating conditions.

VII.A Simulating Non-Ideal Conditions

There are several methods of simulating non-ideal operating conditions in an accessed image obtained by a farming machine 100 operating in an ideal operating condition. In one example, a control system 130 simulates airborne particulates in a labelled image by employing a particulate augmentation model. The particulate augmentation model simulates airborne particulates in a labelled image by generating a digital representation of airborne particulates ("particulate image") and overlaying the particulate image on a labelled image. In this manner, one or more previously accessed images may be used to train a plant identification model to identify plants in non-ideal conditions. That is, the particulate augmentation model generates an array of particulate images from a previously labelled image such that plant matter generated images are correctly labelled despite being obscured by (simulated) particulates.

To generate a particulate image, in an example, the control system 130 generates a randomly sized array with each element in the array assigned a value between 0 and 255. The values for each cell may be assigned randomly, pseudo-randomly, or according to other methods. The control system 130 resizes the array to a similar dimensionality as a labelled image. For example, if the generated array has a dimensionality of 100×100, and the labelled image has a dimensionality of 1920×1280, the control system 130 rescales the array to the dimensionality of 1920×1280.

Figure 8:
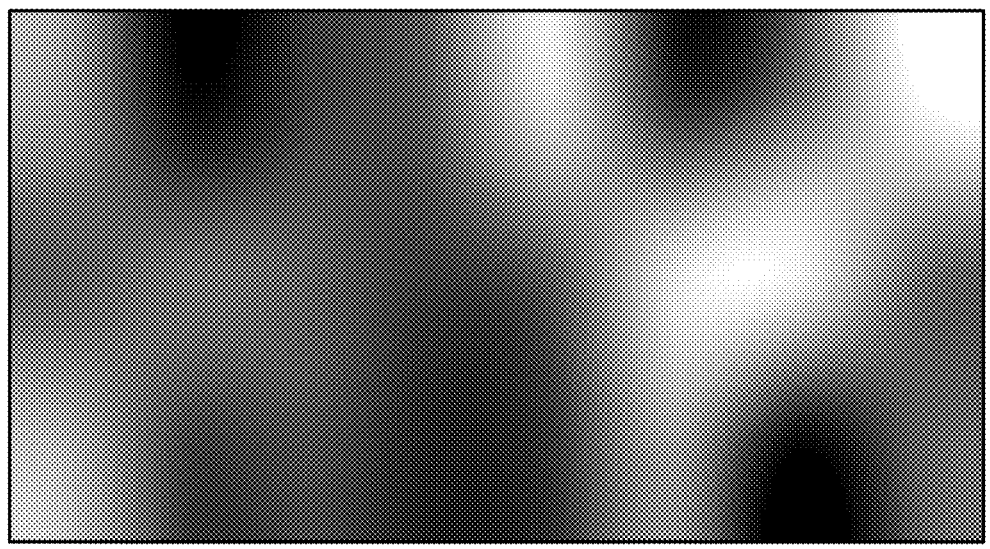
FIG. 8 is an illustration of a scaled array, according to one example embodiment.

The control system 130 may rescale the array using a variety of methods. For example, the control system 130 may apply a scaling function to the array to modify its dimensionality. Some example scaling functions include, a bilinear area scalar function, a linear scalar function, a polynomial scaling function, etc. The resulting array ("scaled array") approximates airborne particulates that may occur in accessed image obtained by a farming machine operating in non-ideal operating conditions. FIG. 8 is an illustration of a scaled array, according to one example embodiment. In this example, the scaled array 810 is generated from a 6×12 array that is scaled to 1920×1280 using a bilinear area scalar function. In the scaled array 810, the color of each cell (i.e., pixel) reflects its corresponding value, with white colored cells having a value of 255 and black colored cells having a value of 0, and grey colored cells having a value between 0 and 255. That is, there is a total of 256 cell colors.

The control system 130 determines a particulate color for the particulate image. In one example, the control system 130 determines the particulate color as an average color of the accessed image. In other words, the control system determines an average value, for each of the RGB channels for all the pixels in a labelled image and the corresponding group of three averaged channel values is the particulate color. In other examples, the control system 130 may determine the particulate color using other methods. For example, the control system may access a previously generated particulate color from a datastore, receive a particulate color from a user of the control system 130, etc. The control system 130 applies the particulate color to the scaled array. The control system applies the particulate color such that cells with the value 255 are the particulate color and cells with the value 0 have no color. Cells with values between 0 and 255 are scaled in transparency according to their value. For example, a cell value of 0 indicates full transparency while a cell value of 255 indicates fully opaque.

The control system 130 generates a particulate image, or particulate images, using the scaled array, the labelled image, and a particulate level. The particulate level is a quantification of how many airborne particulates to include in the particulate image. In an example, the particulate level is a value between 0.0 and 1.0, with 0.0 indicating no airborne particulates and 1.0 indicating many airborne particulates. The control system may generate a particulate image PI according to the function:

$$PI = \frac{p \cdot SA}{TC} \cdot PC + \left(1.0 - \frac{p \cdot SA}{TC}\right) \cdot LI \quad (1)$$

where PC is the 3-dimensional particulate color array, p is the particulate level, SA is the scaled array, TC is the total cell color (e.g., 255), and LI is the labelled image. Notably, in this example, the control system 130 generates a particulate image similarly to an alpha-blend between the scaled array and labelled image, with the amount of blending corresponding to the particulate level.

Figure 9A:
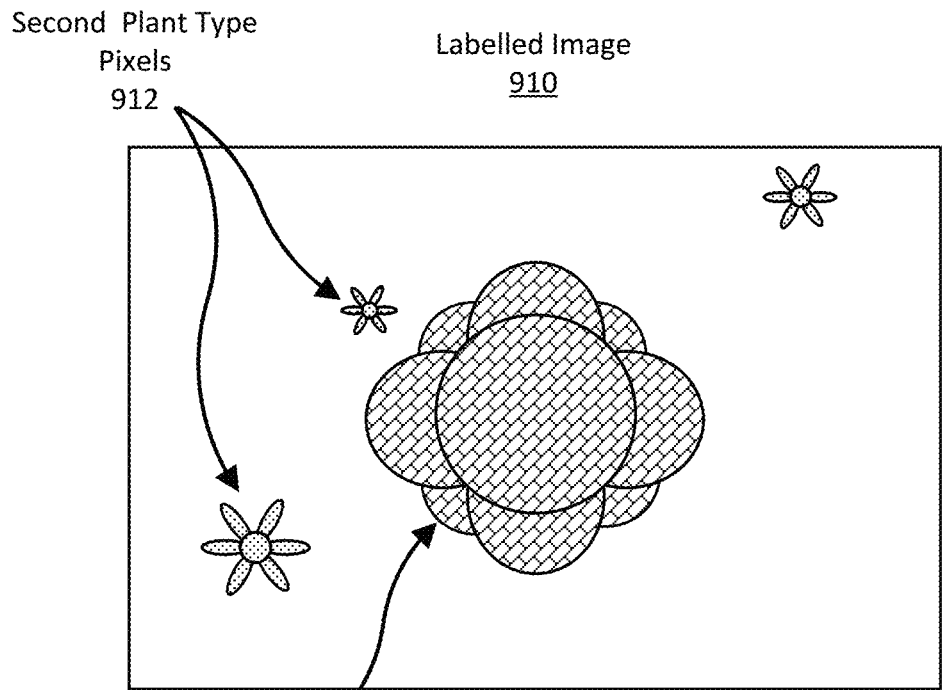
FIG. 9A illustrates a labelled image, according to one example embodiment.
Figure 9B:
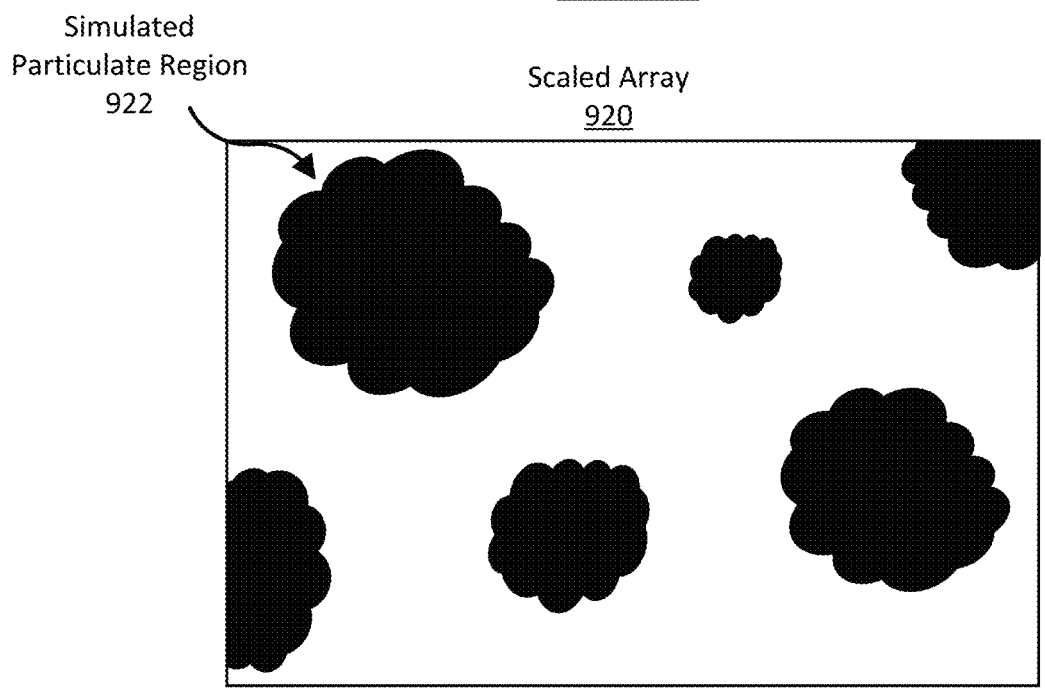
FIG. 9B illustrates a representation of a scaled array, according to one example embodiment.

FIGS. 9A-9F illustrate a process of generating an array of particulate images for a labelled image according to a particulate level. FIG. 9A illustrates a labelled image, according to one example embodiment. The labelled image 910 includes pixels labelled as a plant of a first type 912 and pixels labelled as plants of a second type 914. FIG. 9B illustrates a representation of a scaled array, according to one example embodiment. In this example, for convenience of illustration, cells in the scaled array 920 with a value above a threshold value (e.g., 175) are black, and cells with a value below the threshold are transparent. This allows for a more convenient representation of regions in the scaled array representing airborne particulates (e.g., simulated particulate region 922). Notably, in other examples, a scaled array is more like the scaled array 810 shown in FIG. 8.

FIGS. 9C-9F illustrate particulate images generated according to various particulate levels. FIGS. 9C-9F illustrate a blend between the labelled image of FIG. 9A and the scaled array of FIG. 9B.

Figure 9C:
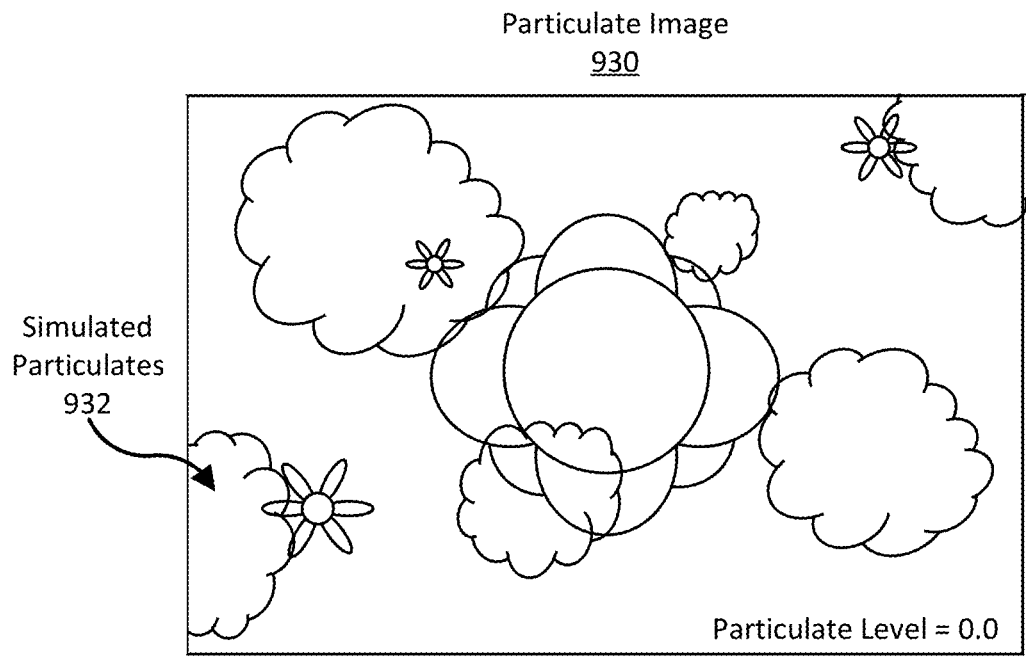
FIG. 9C illustrates a particulate image generated using a first particulate level, according to one example embodiment.

FIG. 9C illustrates a particulate image generated using a first particulate level, according to one example embodiment. In this example, particulate image 930 includes a first particulate level of 0.0. The first particulate level indicates that the particulate image 930 is an alpha-blend including none of the scaled array and all the labelled image. Here, the simulated airborne particulates 932 are shown as an outline for convenience, despite not actually occurring in the particulate image 930.

Figure 9D:
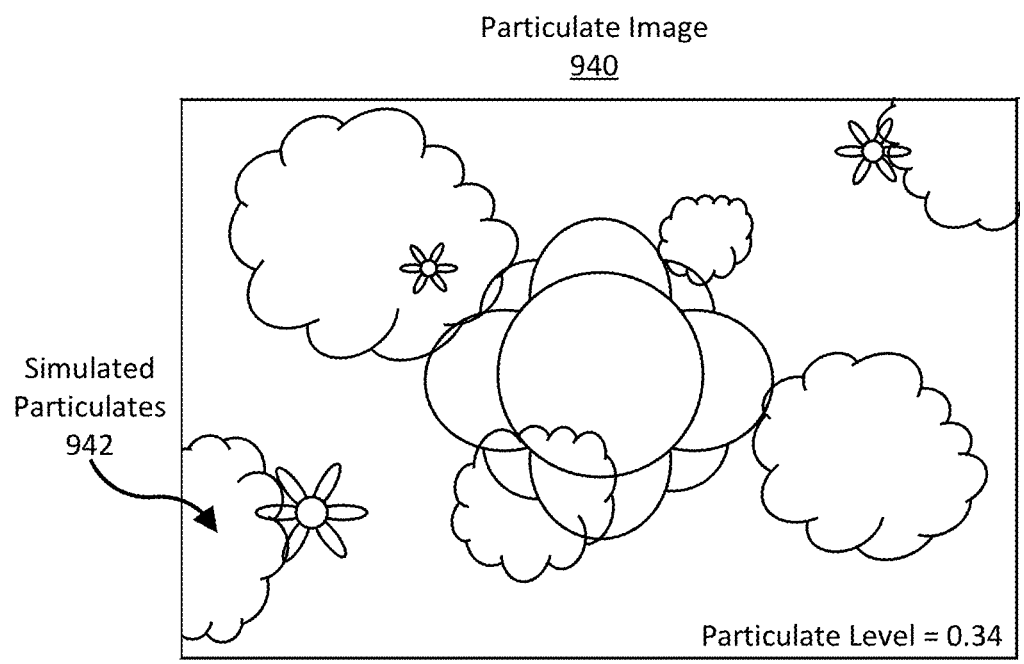
FIG. 9D illustrates a particulate image generated using a second particulate level, according to one example embodiment.

FIG. 9D illustrates a particulate image generated using a second particulate level, according to one example embodiment. In this example, particulate image 940 includes a second particulate level of 0.34. The second particulate level is applied in regions of the particulate image where the scaled array has non-zero values. In areas where the particulate level is applied, the second particulate level indicates that the particulate image 940 is an alpha-blend including 34% of the scaled array and 66% of the labelled image. As illustrated, some of the simulated airborne particulates 942 begin to occlude plants.

Figure 9E:
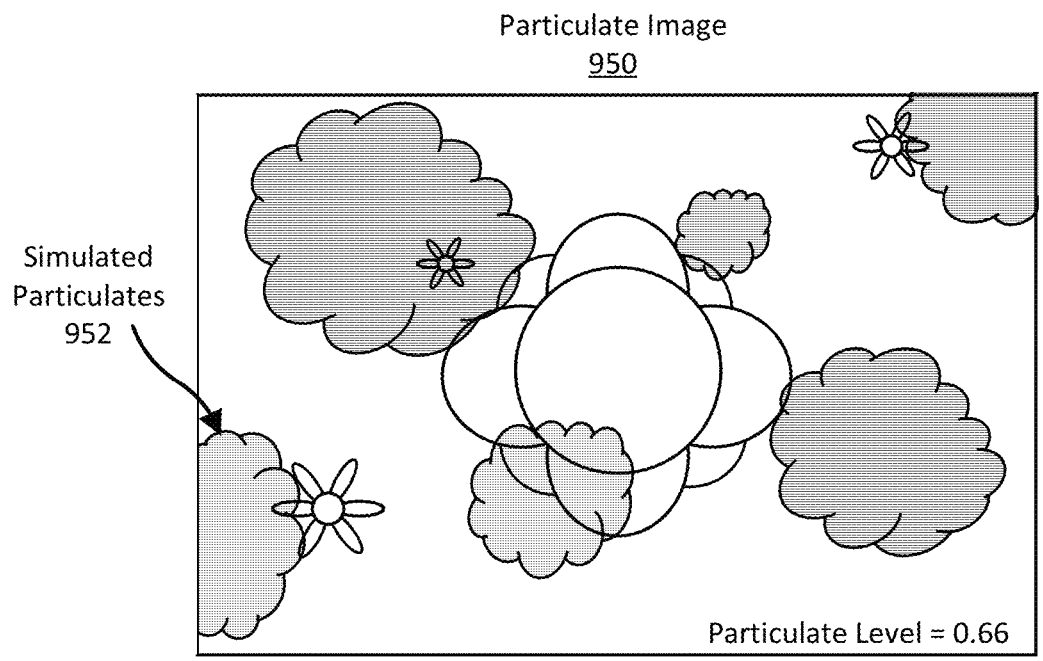
FIG. 9E illustrates a particulate image generated using a third particulate level, according to one example embodiment.

FIG. 9E illustrates a particulate image generated using a third particulate level, according to one example embodiment. In this example, particulate image 950 includes a third particulate level of 0.66. The third particulate level is applied in regions of the particulate image where the scaled array has non-zero values. In areas where the particulate level is applied, the third particulate level indicates that the particulate image 950 is an alpha-blend including 66% of the scaled array and 34% of the labelled image. As illustrated, some of the simulated airborne particulates 952 further occlude the plants, though the plants are still visible in the particulate image 950.

Figure 9F:
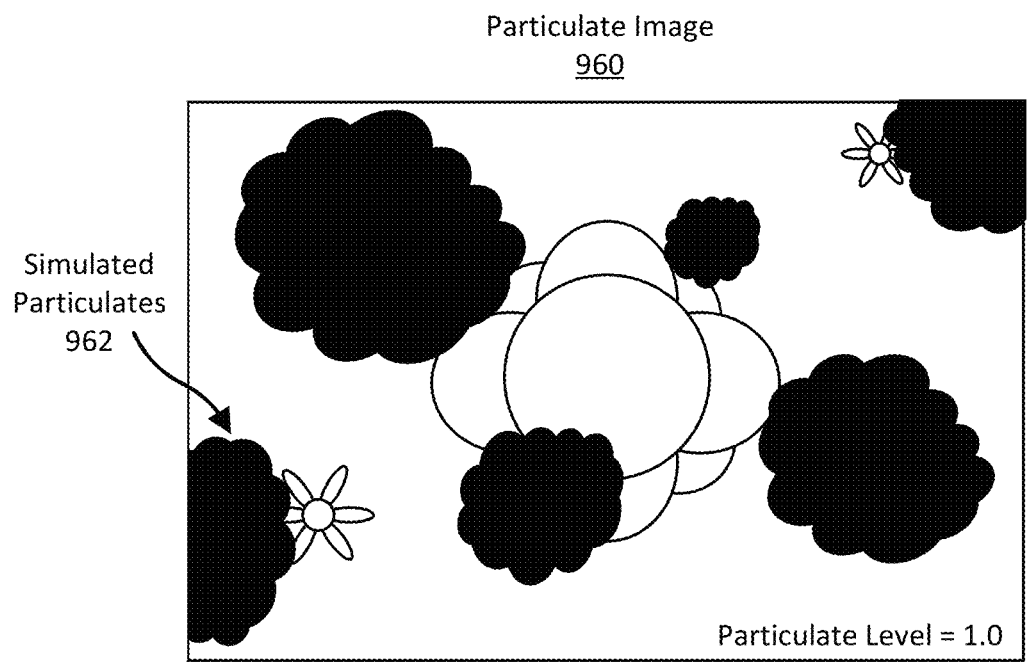
FIG. 9F illustrates a particulate image generated using a fourth particulate level, according to one example embodiment.

FIG. 9F illustrates a particulate image generated using a fourth particulate level, according to one example embodiment. In this example, particulate image 960 includes the fourth particulate level of 1.0. The fourth particulate level is applied in regions of the particulate image where the scaled array has non-zero values. In areas where the particulate level is applied, the fourth particulate level indicates that the particulate image 960 is an alpha-blend including 100% of the scaled array and 0% of the labelled image. As illustrated, of the simulated airborne particulates 962 further occlude the plants. In this case, some of the plants are wholly occluded in the particulate image 960.

The approach of modelling various particulate levels for one image, as illustrated in FIGS. 9C-9F, is superior than collecting images with varying levels of obscuration because human labelling of acquired images is costly, time-consuming, and error prone. Of course, while FIGS. 9C-9F only showed 4 examples of generated particulate levels (e.g., 0.0, 0.34, 0.66, and 1.0), many other possible particulate levels are also possible. More generally, the stochastic nature of the technique described herein allows a control system 130 (or some other system) to generate a vast number of labelled particulate images. The generated particulate images allow for an inexpensive, non-time consuming, and nearly error-free method of training a particulate augmentation model that more accurately identifies plants in non-ideal operating conditions.

The array of particulate images may be used to train a plant identification model (e.g., model 500) to identify plants in non-ideal operating conditions. Arrays of particulate images are informative because each particulate image corresponds to a previously labelled image. That is, even if the particulate image includes simulated particulates that wholly obscure plant matter (i.e., an obscuring pixel), the obscuring pixel is still labelled as plant matter. In this way, a model can be trained to identify latent information in an image to identify plants when one or more of the pixels representing the plant are obscured pixels. For example, referring to FIGS. 9F and 9A, a second type of plant is represented by a group of pixels in the bottom left of the labelled image 910. In the particulate image 960, a portion of the plant is obscured by the simulated particulates. However, the obscuring pixels are still labeled as pixels representing the second type of plant. Because the particulate image is used to train a model, the model identifies latent information in an image representing the plant despite the presence of airborne particulates that obscure all or some portion of the plant.

There are various methods for generating arrays of particulate image for training a plant identification model. In one example, as illustrated above, the control system 130 can select a range of particulate levels and generate corresponding particulate images for a labelled image. However, this method may cause the control system 130 to generate too many particulate images for training a plant identification model. For example, the control system 130 may generate a particulate image for labelled images not including any plants, labelled images already including airborne particulates. Thus, in another example, the control system 130 determines a particulate probability for a labelled image and generates particulate images based on the probability. The particulate probability is a quantification of a likelihood that a labelled image includes airborne particulates. The control system can determine a particulate probability based on a variety of factors. For example, the control system 130 determines a particulate probability based on characteristics of a labelled image. To provide context, the control system 130 determines a particulate probability (e.g., 70%) based on the color distribution of a labelled image (90% dark brown pixels). The control system 130 then selects a particulate level (e.g., 0.0) based on determined particulate probability (70%) because the color distribution indicates that the labelled image already includes many airborne particulates and/or includes mainly soil. In another example, the control system 130 determines a particulate probability based on a particulate distribution. The particulate distribution is a quantification of previously determined particulate levels in accessed images. For example, the control system 130 may determine a particulate level for a number of previously obtained images. The control system then generates a distribution representing the particulate levels in the images. Thus, when the control system generates particulate images, they generated images adhere to previously determined particulate distributions. In these manners, the control system 130 generates particulate images that are more informative for training a plant identification model configured to identify plants in non-ideal operating conditions.

VII.B Plant Identification in Non-Ideal Operating Conditions

A control system 130 employing plant identification model trained using particulate images is more precise and accurate at identifying plants in non-ideal operating conditions. For example, FIGS. 10A-11C compare the identification capabilities of a plant identification model that is not trained using particulate images ("normal model") and a plant identification model trained using particulate images ("augmented model").

Figure 10A:
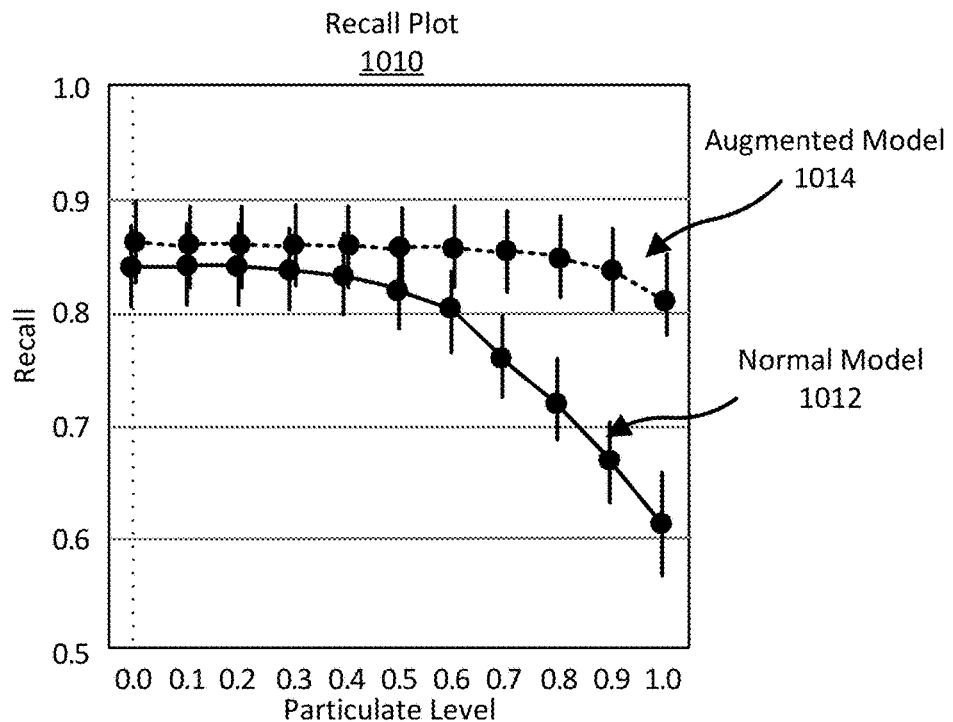
FIG. 10A is a recall plot comparing the recall of a normal model and an augmented model in identifying weeds in accessed images, according to one example embodiment.

FIG. 10A is a recall plot comparing the recall of a normal model and an augmented model in identifying weeds in accessed images, according to one example embodiment. In a recall plot, the y-axis is recall and the x-axis is the particulate level in an accessed image. The recall plot 1010 includes a line for the normal model 1012 and a line for the augmented model 1014. Each line represents the true positive rate (i.e., recall) of each model when identifying a weed in an accessed image. The normal model 1012 has a substantially lower recall than the augmented model 1014 when identifying weeds in accessed images with a particulate level above 0.5.

Figure 10B:
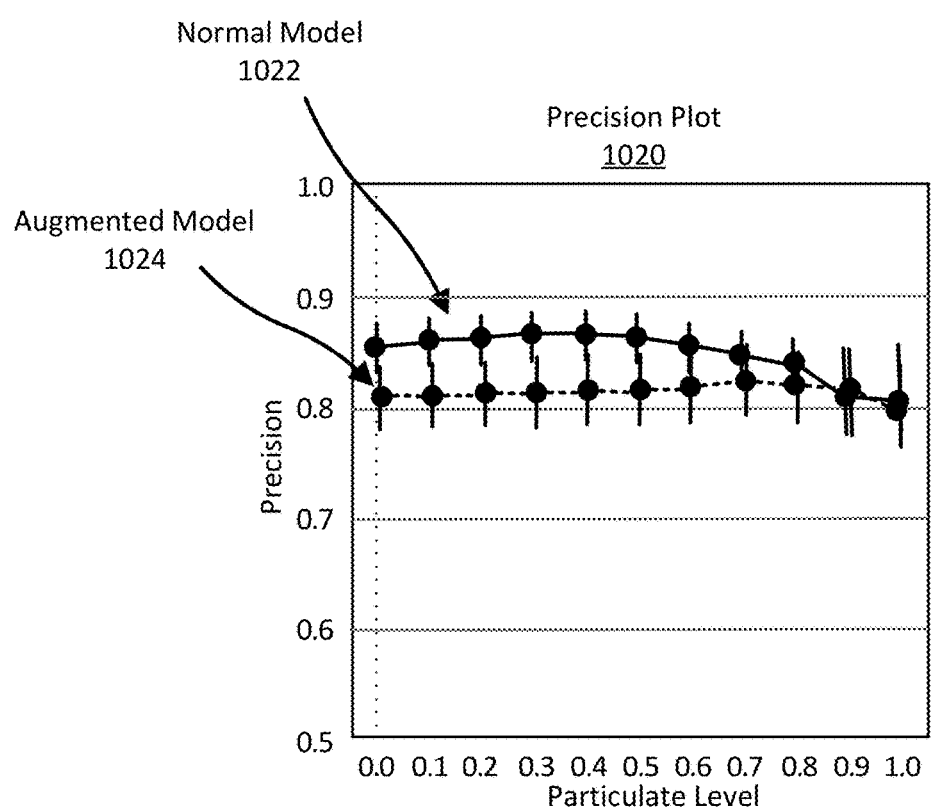
FIG. 10B is a precision plot comparing the precision of a normal model and an augmented model in identifying weeds in accessed images, according to one example embodiment.

FIG. 10B is a precision plot comparing the precision of a normal model and an augmented model in identifying weeds in accessed images, according to one example embodiment. In a precision plot, the y-axis is precision and the x-axis is the particulate level in an accessed image. The precision plot 1020 includes a line for the normal model 1022 and a line for the augmented model 1024. Each line represents the positive predictive value (i.e., precision) of each model when identifying a weed in an accessed image. The normal model 1022 has a comparable precision than the augmented model 1024 when identifying weeds in accessed images with a particulate level above 0.6.

Figure 10C:
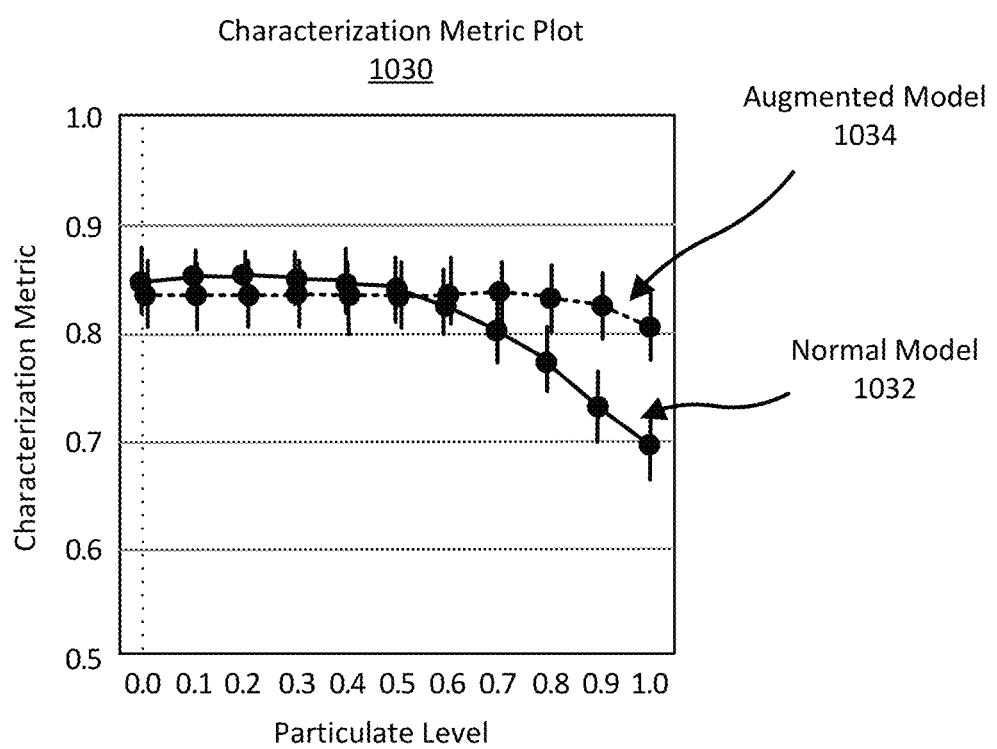
FIG. 10C is a characterization metric plot comparing a characterization metric of a normal model and an augmented model in identifying weeds in accessed images, according to one example embodiment.

FIG. 10C is a characterization metric plot comparing a characterization metric of a normal model and an augmented model in identifying weeds in accessed images, according to one example embodiment. In a characterization metric plot, the y-axis is characterization metric and the x-axis is the particulate level in an accessed image. The characterization metric plot 1030 includes a line for the normal model 1032 and a line for the augmented model 1034. Each line represents the harmonic mean (e.g., F1 score) of the positive predictive value and true positive rate of each model when identifying a weed in an accessed image. The normal model has a lower characterization metric than the augmented model when identifying weeds in accessed images with a particulate level above 0.6.

Figure 11A:
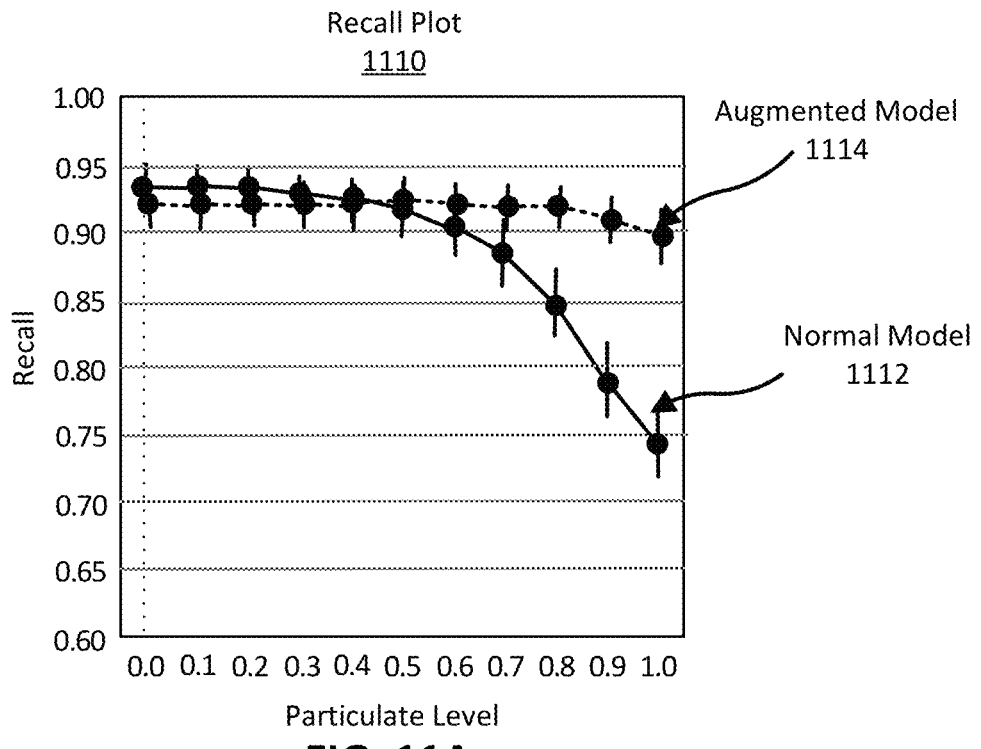
FIG. 11A is a recall plot comparing the recall of a normal model and an augmented model in identifying crops in accessed images, according to one example embodiment.

FIG. 11A is a recall plot comparing the recall of a normal model and an augmented model in identifying crops in accessed images, according to one example embodiment. The recall plot 1110 includes a line for the normal model 1112 and a line 1114 for the augmented model. The normal model 1112 has a lower recall than the augmented model 1114 when identifying crops in accessed images with a particulate level above 0.6.

Figure 11B:
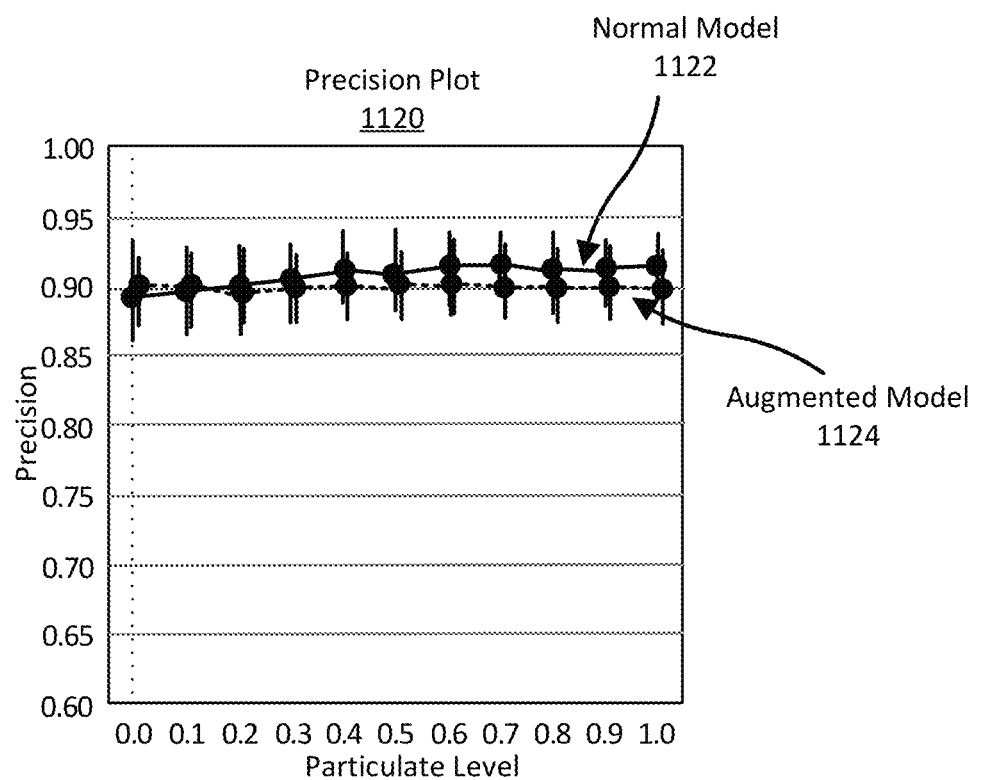
FIG. 11B is a precision plot comparing the precision of a normal model and an augmented model in identifying crops in accessed images, according to one example embodiment.

FIG. 11B is a precision plot comparing the precision of a normal model and an augmented model in identifying crops in accessed images, according to one example embodiment. The precision plot 1120 includes a line 1122 for the normal model and a line 1124 for the augmented model. The normal model 1122 has a comparable precision to the augmented model 1124 when identifying crops in accessed images for all particulate levels.

Figure 11C:
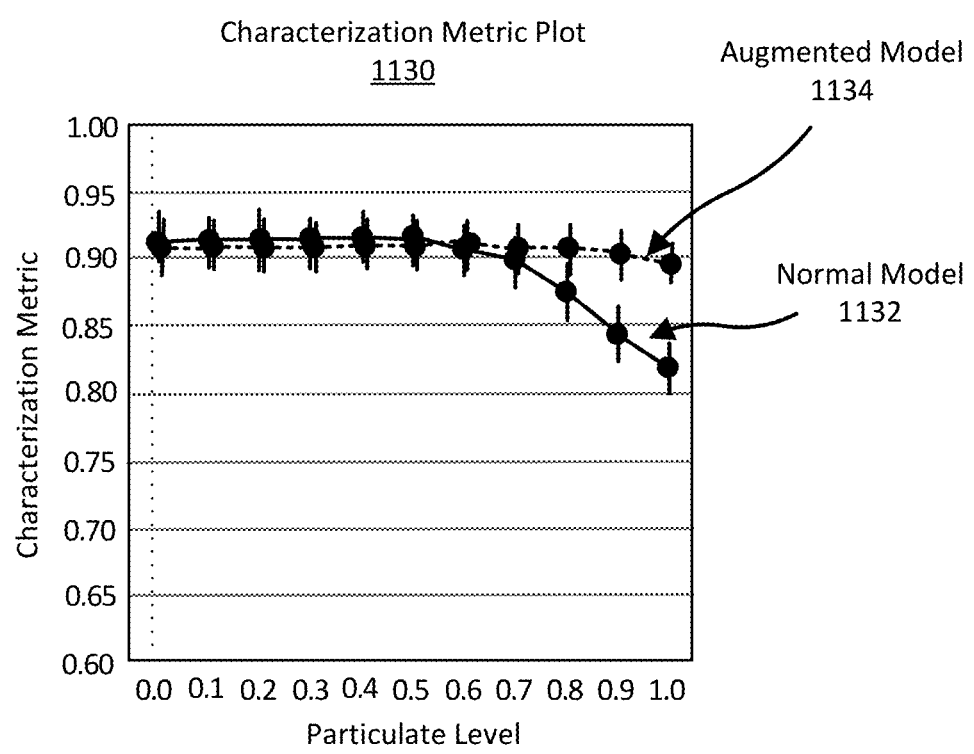
FIG. 11C is a characterization metric plot comparing a characterization metric ability of a normal model and an augmented model in identifying crops in accessed images, according to one example embodiment.

FIG. 11C is a characterization metric plot comparing a characterization metric ability of a normal model and an augmented model in identifying crops in accessed images, according to one example embodiment. The characterization metric plot 1130 includes a line 1132 for the normal model and a line 1134 for the augmented model. The normal model 1132 has a lower characterization metric than the augmented model 1134 when identifying crops in accessed images with a particulate level above 0.6.

A control system 130 employing an augmented model is more precise and accurate than a normal model which also leads to improved treatment of identified plants (e.g., less overspray, fewer spray misses, etc.). For example, FIGS. 12A-13B compare the treatment capabilities of a farming machine employing a normal model ("normal machine") vs. a farming machine employing an augmented model ("augmented machine") to treat plants in a field.

Figure 12A:
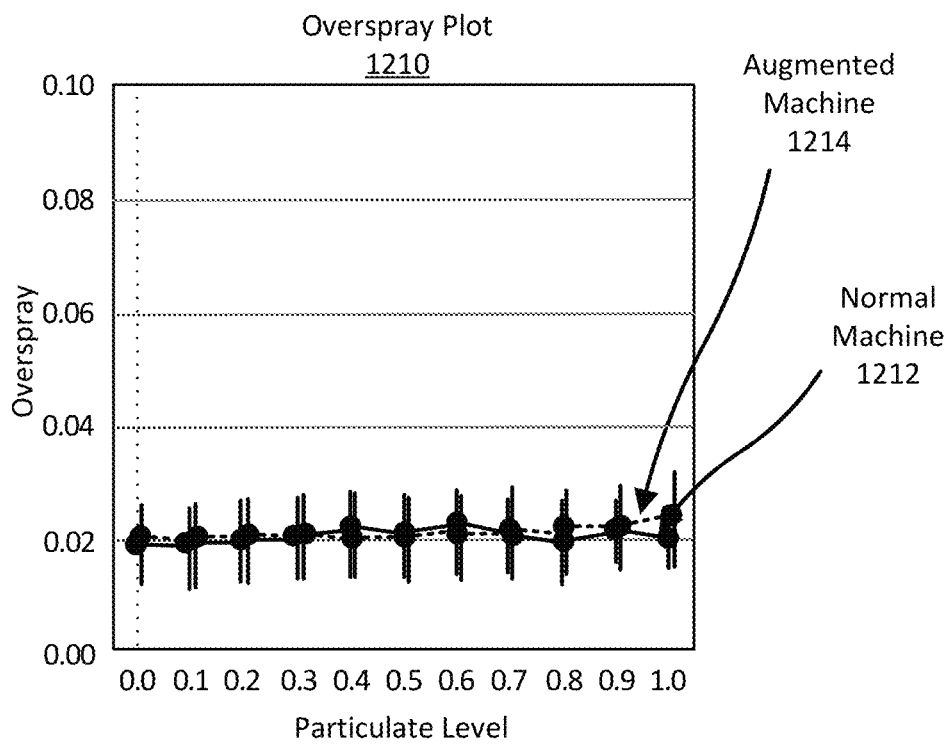
FIG. 12A is an overspray plot comparing the overspray of a normal machine and an augmented machine, according to one example embodiment.

FIG. 12A is an overspray plot comparing the overspray of a normal machine and an augmented machine, according to one example embodiment. Overspray is a quantification of an extra amount of area treated by a farming machine when unnecessary (i.e., the farming machine sprays an area when there is no weed). In the overspray plot 1210, the y-axis is the overspray and the x-axis is the particulate level in an accessed image. The overspray plot 1210 includes a line for the normal machine 1212 and a line for the augmented machine 1214. Each line represents the overspray of each machine when treating identified weeds. The normal machine and the augmented machine have similar overspray for all values of particulate level.

Figure 12B:
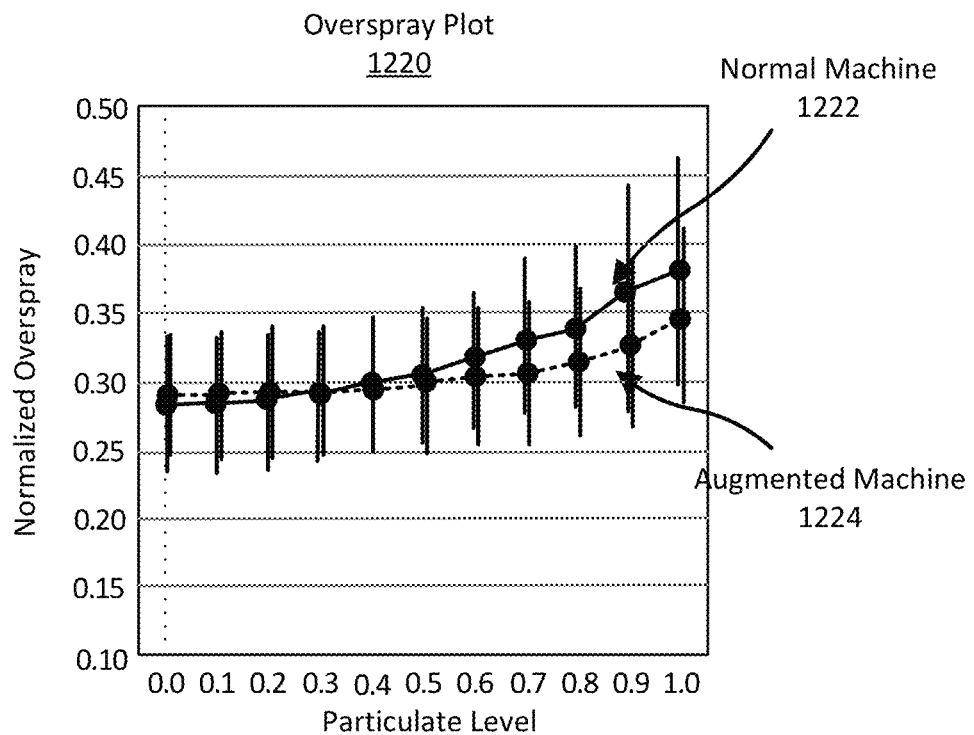
FIG. 12B is an overspray plot comparing an overspray of a normal machine and an augmented machine, according to one example embodiment.

FIG. 12B is an overspray plot comparing an overspray of a normal machine and an augmented machine, according to one example embodiment. In the overspray plot 1220, the overspray is normalized to the number of weeds detected. That is, the overspray plot illustrates an average overspray of identified weeds. In the overspray plot 1220, the y-axis is a normalized overspray and the x-axis is the particulate level in an accessed image. The overspray plot 1220 includes a line for the normal machine 1222 and a line for the augmented machine 1224. Each line represents the overspray of each machine when treating identified weeds.

Figure 13A:
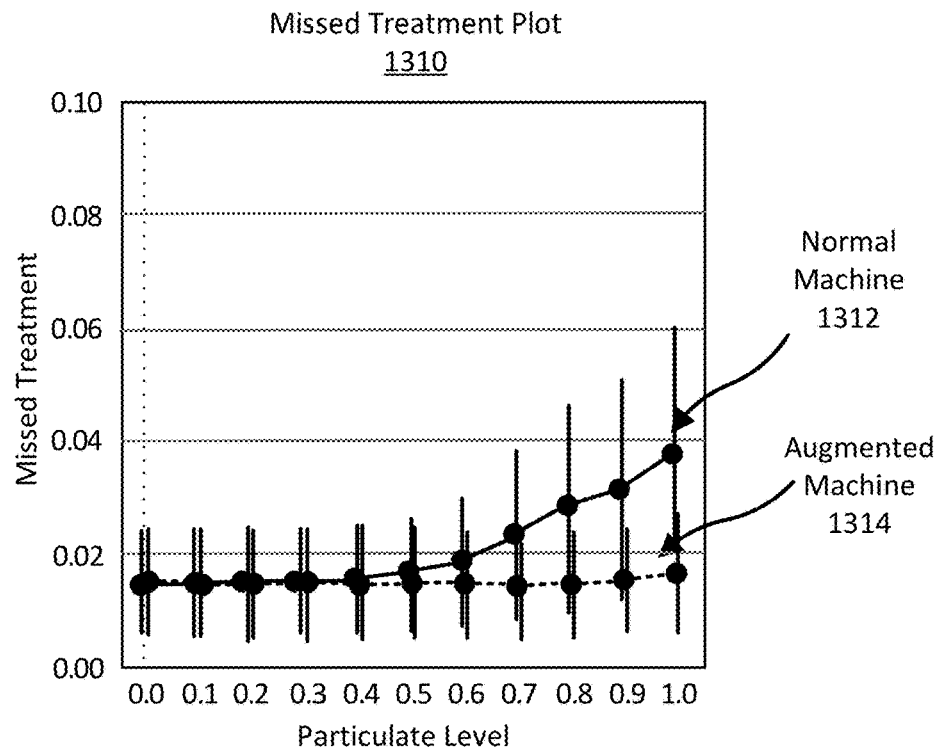
FIG. 13A is a missed treatment plot comparing the missed treatments of a normal machine and an augmented machine, according to one example embodiment.

FIG. 13A is a missed treatment plot comparing the missed treatments of a normal machine and an augmented machine, according to one example embodiment. Missed treatment is a quantification of an amount of area untreated by a farming machine when necessary (i.e., the farming machine does not spray an area when there is a weed). In the missed treatment plot 1310, the y-axis is the missed treatment and the x-axis is the particulate level in an accessed image. The missed treatment plot 1310 includes a line for the normal machine 1312 and a line for the augmented machine 1314. Each line represents the missed treatment of each machine when treating identified weeds. The augmented machine 1314 has an appreciably lower missed treatment normal than the normal machine 1310 for particulate values greater than 0.7.

Figure 13B:
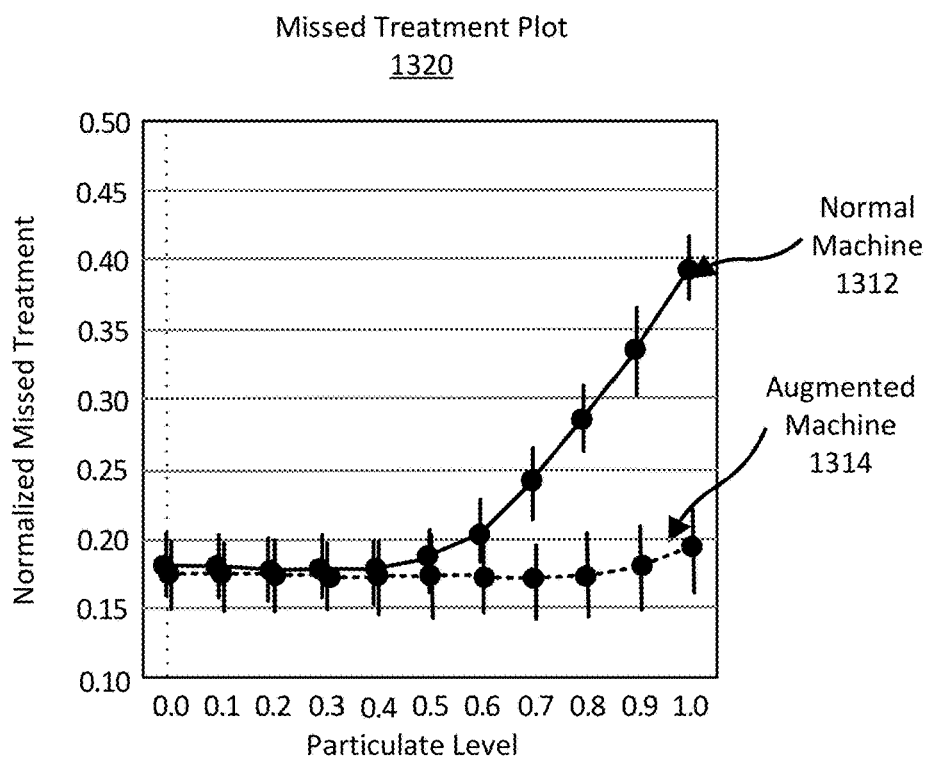
FIG. 13B is a missed treatment plot comparing a missed treatment of a normal machine and an augmented machine, according to one example embodiment.

FIG. 13B is a missed treatment plot comparing a missed treatment normal of a normal machine and an augmented machine, according to one example embodiment. In the missed treatment plot 1320, the missed treatment is normalized to the number of weeds existed in the field. That is, the missed treatment plot 1320 illustrates an average missed treatment of identified weeds. In the missed treatment plot 1320, the y-axis is a normalized missed treatment and the x-axis is the particulate level in an accessed image. The missed treatment plot 1320 includes a line for the normal machine 1322 and a line for the augmented machine 1324. Each line represents the missed treatment of each machine when treating identified weeds. The augmented machine 1324 has an appreciably lower missed treatment than the normal machine 1322 for particulate values greater than 0.7.

VII.C Determining a Particulate Level in an Accessed Image

As described herein, a control system 130 may employ a plant identification model configured to determine a particulate level in an accessed image. Throughout the embodiments, the plant identification models are trained using alpha-blended augmented images as described above. In some embodiments, the control system 130 may utilize the alpha-blend levels in augmented images when determining a particulate level. For example, the augmented images may include augmented images with different alpha-blend levels (e.g., 0%, 10%, etc.). In this case, when determining a particulate level, the control system 130 identifies which of the alpha-blend levels in an augmented image most closely corresponds to the particulate level in an accessed image. In this manner, the alpha-blend level is an estimation as to the number of particulates in the accessed image compared to an image that does not include particulates. Additionally, in some embodiments, the control system 130 may utilize other information from the augmented images when determining a particulate level (e.g., particulate color, etc.). In these embodiments, the determined particulate level may be a quantification of that other information in the augmented images.

In various embodiments, the plant identification model may employ one or more approaches to determine a particulate level in the accessed image. Broadly, these methods may be grouped into, for example, two groups: (i) image level identification, and (ii) pixel level identification. Other groups are also possible. Image level identification determines a particulate level for an accessed image based on an aggregate classification of pixels in the image. Pixel level identification determines a particulate level based on a classification of individual pixels in an accessed image and subsequent analysis of the classified pixels. Both types of determination may employ classification and/or regression analysis techniques.

To illustrate, in an example, a control system 130 employs a plant identification model (model 500) to determine a particulate level for the image at the image level. In this case, the control system 130 employs the model to identify obscuring pixels in an accessed image. The control system may determine the particulate level based on the identified obscuring pixels in the output image. For example, the control system 130 identifies the particulate level as 'high' if the number of obscuring pixels in an accessed image is above an upper threshold, Contrarily, the control system 130 identifies the particulate level as 'low' if the number of obscuring pixels is below a lower threshold. Other ranges of particulate levels are also possible, such as, for example, levels 1-10, a red, yellow, green classification, a continuous value between 0 and 100, etc.).

As another illustration, for example, a control system 130 employs a plant identification model (model 500) to determine a particulate level for the image at the pixel level. In this case, the control system 130 may determine a particulate level for the image based on the particulate levels for individual pixels in the image. In one example, the control system may compute a ratio of obscuring pixels to total pixels (or plant pixels) and determines the particulate level for the image based on the determined ratio. More specifically, the control system may identify a particulate level as 'high' if the ratio of obscuring pixels to total pixels (or plant pixels) in an accessed image is above a threshold, while the control system may identify a particulate level as 'low' if the ratio of obscuring pixels to total pixels (or plant pixels) is below a threshold.

In some cases, the control system 130 may determine a particulate level for individual pixels and the particulate level for the individual pixels may influence the determination of the particulate level for the image. For example, the control system may assign each pixel in the image a particulate level, and the determined particulate level for the image is the average of the particulate levels in the image. The control system 130 may determine a particulate level for an accessed image based on other metrics and/or statistics calculated from pixel level analysis of the image. For example, the control system may determine a distribution, a shape, an average color, etc., of obscuring pixels, plant pixels, or total pixels in an accessed image to determine a particulate level. In various examples, the control system 130 may compare metrics for one type of pixel (e.g., obscuring pixels) to another type of pixel (e.g., plant pixels) or total pixels when determining a particulate level.

The control system 130 may employ several methods to present determined particulate levels in an accessed image to a user (e.g., via a display). In one example, the control system 130 quantifies the particulate level using any of the metrics described herein and presents the metric to the user. To illustrate, the control system 130 may present the ratio of obscuring pixels to plant pixels in an accessed to a user. In another example, the control system 130 may employ a binary classification system when presenting determined particulate levels. To illustrate, the control system 130 may calculate the total number of obscuring pixels in an accessed image. If the number of pixels in the accessed image is above/below a threshold, the control system presents the particulate level as high/low. In another example, the control system 130 may employ a contextual classification system when presenting determined particulate levels. To illustrate, the control system 130 may determine the ratio of obscuring pixels to plant pixels. The control system 130 then applies, for example, a four-bin classification system to the determined ratio. That is, based on the determined ratio, the control system 130 may present the determined particulate level as GREEN (i.e., no particulates), YELLOW (i.e., few particulates), ORANGE (i.e., some particulates), or RED (i.e., many particulates) based on the ratio. Other methodologies are also possible.

The control system 130 may generate a notification based on the determined particulate level. For example, the control system 130 may determine that the particulate level is between 0.7 and 1.0 and generate a notification in response. The control system 130 may transmit the notification to an operator of the farming machine 100 and/or a party responsible for agricultural management of the field. The notification may indicate the particulate level. For example, the notification may indicate to the operator that the particulate level in the field is high, that treatments are becoming inaccurate, or similar. Additionally, the notification may indicate an action based on the determined particulate level. For example, the notification may encourage the operator to wait for better operating conditions, travel at a slower speed, etc. In another example, the notification may indicate for the operator to switch between broadcast and selective spraying based on the determined particulate level. To illustrate, if the particulate level is high and the plant identification model is unable to accurately identify plants, the control system may suggest that the operator employ broadcast spraying rather than selective spraying.

VIII. Control System

Figure 14:
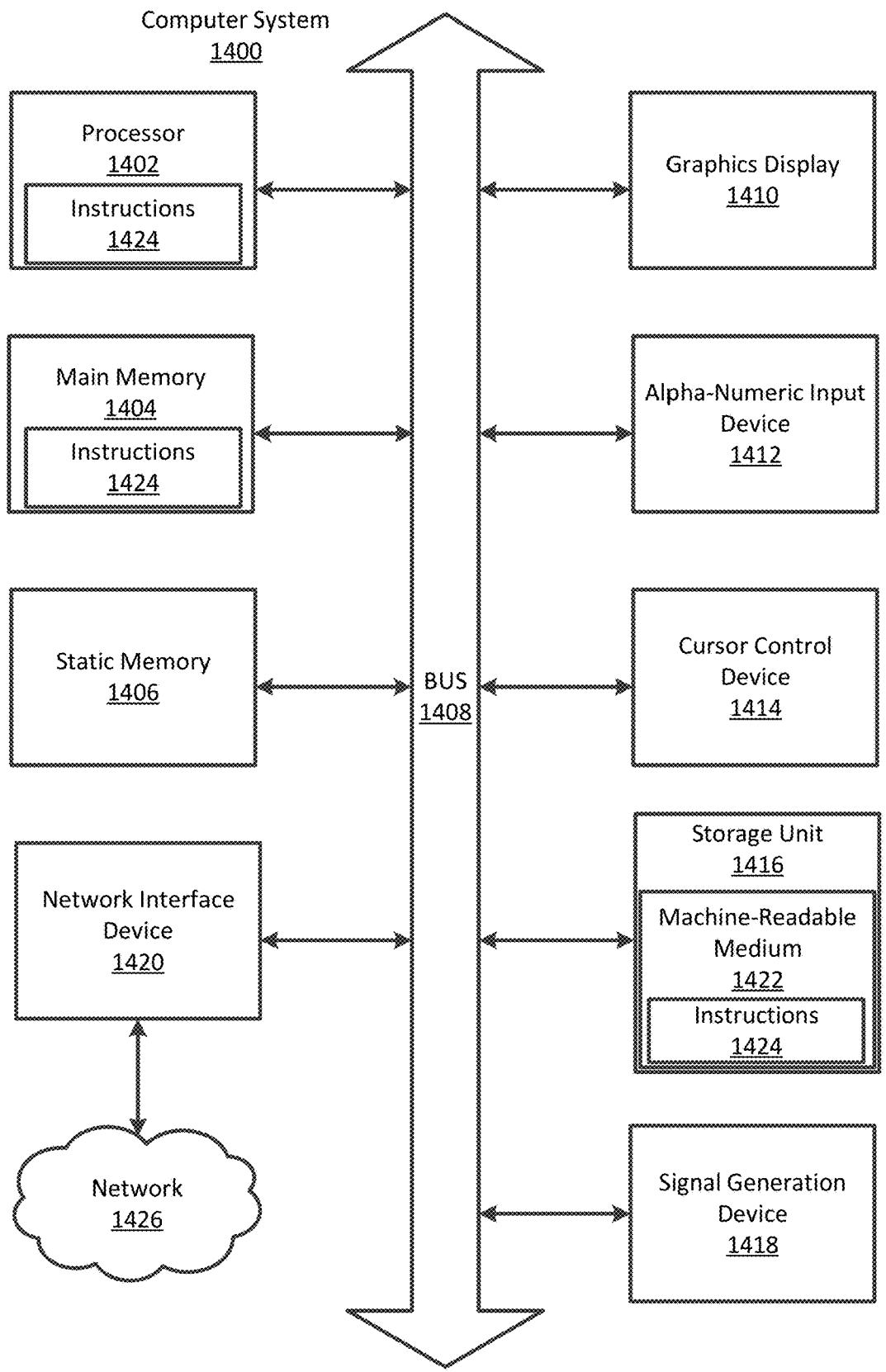
FIG. 14 is a block diagram illustrating components of an example machine for reading and executing instructions from a machine-readable medium, according to one example embodiment.

FIG. 14 is a block diagram illustrating components of an example machine for reading and executing instructions from a machine-readable medium. Specifically, FIG. 14 shows a diagrammatic representation of control system 130 in the example form of a computer system 1400. The computer system 1400 can be used to execute instructions 1424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes one or more processing units (generally processor 1402). The processor 1402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1400 also includes a main memory 1404. The computer system may include a storage unit 1416. The processor 1402, memory 1404, and the storage unit 1416 communicate via a bus 1408.

In addition, the computer system 1400 can include a static memory 1406, a graphics display 1410 (e.g., to drive a plasma display panel (PDP), a liquid crystal display (LCD), or a projector). The computer system 1400 may also include alphanumeric input device 1412 (e.g., a keyboard), a cursor control device 1414 (e.g., a mouse, a trackball, a joystick, a motion sensor, or other pointing instrument), a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. For example, the instructions 1424 may include the functionalities of modules of the system 130 described in FIG. 2. The instructions 1424 may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 may be transmitted or received over a network 1426 via the network interface device 1420.

IX. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for treating a plant in a field by a farming machine that moves through the field:
    accessing an image of a plant within an environment, the image captured as the farming machine move past the plant in the field, the image comprising one or more pixels representing plant matter of the plant, one or more pixels representing the environment surrounding the plant, and one or more pixels representing airborne particulates;
    identifying pixels in the image representing the plant using a plant identification model by:
        classifying pixels in the image that represent plant matter as plant pixels,
        classifying pixels in the image that represent the airborne particulates as particulate pixels, and
        identifying the plant as a set of representative pixels in the image, the set of representative pixels including one or more plant pixels and one or more particulate pixels; and
    actuating a plurality of plant treatment mechanisms coupled to the farming machine to treat the identified plant as the farming machine moves past the plant in the field.

2. The method of claim 1, wherein using the plant identification model to identify pixels comprises:
    determining a particulate level in the image based on the classified plant pixels and the classified particulate pixels, the particulate level representative of a number of airborne particulates in the image.

3. The method of claim 2, wherein determining the particulate level in the image based on the classified plant pixels and the classified particulate pixels comprises:
    calculating a ratio of the number of particulate pixels to a total number of pixels in the image.

4. The method of claim 1, wherein classifying particulate pixels in the image comprises:

classifying pixels in the image as obscuring pixels, each obscuring pixel comprising a particulate pixel representing an airborne particulate which obscures plant matter of the plant in the image.

5. The method of claim 1, wherein the plant identification model includes a plurality of layers in a convolutional neural network, and wherein identifying pixels in the image representing the plant using the plant identification model comprises:
encoding the image onto a first layer as an encoded image;
transforming the encoded image to a reduced image on a second layer;
classifying latent features representing plant matter in the reduced image as plant matter;
classifying latent features representing airborne particulates in the reduced image as airborne particulates; and
decoding the reduced image to a decoded image, the decoded image including:
one or more plant pixels having latent features identified as plant matter, and
one or more particulate pixels having latent features identified as airborne particulates.

6. The method of claim 5, wherein applying the plant identification model further comprises:
classifying latent features in the reduced image as particulates that obscure plant matter of the plant;
wherein the decoded image includes one or more obscuring pixels having latent features identified as airborne particulates that are obscuring plant matter of the plant.

7. The method of claim 1, wherein applying the plant identification model to classify particulate pixels further comprises:
training the plant identification model using a dust augmentation model, the dust augmentation model simulating a plurality of particulate images for a plurality of previously accessed images.

8. The method of claim 7, wherein the plurality of previously accessed images each includes one or more pixels representing one or more plants, and each of the pixels representing a plant is labelled as representing plant matter.

9. The method of claim 7, wherein training the plant identification model using the dust augmentation model further comprises:
generating a first array of particulate images from a first image of the plurality of previously accessed images, each particulate image having an alpha-blend level of a plurality of alpha-blend levels, wherein each alpha-blend level is a blend between an unobscured image of one or more plants in the first image and an obscured image of one or more plants in the first image.

10. The method of claim 9, wherein a particulate level in a particulate image of the first array of particulate images is a quantification of an alpha-blend level in the accessed image.

11. The method of claim 9, wherein the unobscured image includes no particulate pixels.

12. The method of claim 9, wherein the obscured image of the plant includes particulate pixels.

13. The method of claim 9, further comprising:
determining a particulate color, the particulate color an average color of the plurality of pixels in the first image;
wherein particulates in the obscured image have the particulate color.

14. The method of claim 1, further comprising:
generating a particulate notification, the particulate notification including a quantification of a ratio of a number of particulate pixels to a total number of pixels in the accessed image.

15. The method of claim 14, further comprising:
transmitting the particulate notification to an operator of the farming machine.

16. A farming machine for treating plants in a field as the farming machine moves in the field, the farming machine comprising:
a plurality of plant treatment mechanisms coupled to the farming machine, the plurality of plant treatment mechanisms for treating plants in the field;
a detection mechanism coupled to the farming machine, the detection mechanism for capturing an image of a plant as the farming machine moves past the plant in the field;
a processor; and
a non-transitory computer readable storage medium storing instructions that, when executed by the processor, cause the processor to:
access the image of a plant within an environment, the image comprising one or more pixels representing plant matter of the plant, one or more pixels representing the environment surrounding the plant, and one or more pixels representing airborne particulates,
identify pixels in the image representing the plant using a plant identification model by causing the processor to:
classify pixels in the image that represent plant matter as plant pixels,
classify pixels in the image that represent the airborne particulates as particulate pixels, and
identify the plant as a set of representative pixels in the image, the set of representative pixels including one or more plant pixels and one or more particulate pixels; and
actuate one or more of the plurality of plant treatment mechanisms to treat the identified plant as the farming machine moves past the plant in the field.

17. The farming machine of claim 16, wherein the instructions for classifying particulate pixels in the image further cause the processor to:
classify pixels in the image as obscuring pixels, each obscuring pixel comprising a particulate pixel representing an airborne particulate which obscures plant matter of the plant in the image.

18. The farming machine of claim 16, wherein the instructions for using the plant identification model to identify pixels further cause the processor to:
determine a particulate level in the image based on the classified plant pixels and the classified particulate pixels, the particulate level representative of a number of particulates in the image.

19. A non-transitory computer readable storage medium storing instructions for identifying and treating a plant using a farming machine as the farming machine moves through a field, the instructions, when executed by a processor, causing the processor to:
access an image of the plant within an environment, the image captured as the farming machine move past the plant in the field, the image comprising one or more pixels representing plant matter of the plant, one or more pixels representing the environment surrounding the plant, and one or more pixels representing airborne particulates;

identify pixels in the image representing the plant using a plant identification model by causing the processor to:
  classify pixels in the image that represent plant matter as plant pixels,
  classify pixels in the image that represent the airborne particulates as particulate pixels, and
  identify the plant as a set of representative pixels in the image, the set of representative pixels including one or more plant pixels and one or more particulate pixels; and actuate a plurality of plant treatment mechanisms coupled to the farming machine to treat the identified plant as the farming machine moves past the plant in the field.

20. The non-transitory computer readable storage medium of claim 19, wherein using the plant identification model to identify pixels comprises:
  determining a particulate level in the image based on the classified plant pixels and the classified particulate pixels, the particulate level representative of a number of airborne particulates in the image.

* * * * *